United States Patent
Mizutani

Patent Number: 5,856,893
Date of Patent: Jan. 5, 1999

[54] MAGNETIC RECORDING/REPRODUCING APPARATUS AND METHOD FOR CONTROLLING AN INCLINATION ANGLE OF A ROTATIONAL DRUM IN THE MAGNETIC RECORDING/REPRODUCING APPARATUS

[75] Inventor: Yoshio Mizutani, Yokohama, Japan

[73] Assignee: Victor Company of Japan, Ltd., Yokohama, Japan

[21] Appl. No.: 609,631

[22] Filed: Mar. 1, 1996

[30] Foreign Application Priority Data

Mar. 2, 1995 [JP] Japan .................................... 7-066664

[51] Int. Cl.⁶ .................................................. G11B 21/04
[52] U.S. Cl. ............................ 360/70; 360/73.04; 360/76
[58] Field of Search .............................. 360/73.04, 73.14, 360/75, 77.12, 77.13, 77.14, 77.15, 76, 70, 130.24; 386/68, 78, 79

[56] References Cited

U.S. PATENT DOCUMENTS

| | | | |
|---|---|---|---|
| 4,703,370 | 10/1987 | Inoue et al. | 360/77.13 X |
| 4,816,927 | 3/1989 | Rijckaert et al. | 360/77.13 X |
| 5,214,546 | 5/1993 | Yamada | 360/77.13 |
| 5,353,173 | 10/1994 | Yoo | 360/76 |
| 5,504,642 | 4/1996 | Kinjo et al. | 360/109 |
| 5,510,938 | 4/1996 | Sakakibara et al. | 360/77.14 |

FOREIGN PATENT DOCUMENTS 5307725 11/1993 Japan .
6187037 7/1994 Japan .

*Primary Examiner*—Andrew L. Sniezek
*Attorney, Agent, or Firm*—Pollock, Vande Sande & Amernick

[57] ABSTRACT

An envelope is detected from each of a plurality of reproduced video FM signals successively read out from a magnetic tape, and a shape change of the envelope in one vertical scanning period is detected in a control microcomputer. In cases where the shape of the envelope is flattened, the flatness indicates that an inclination angle of a rotational drum is appropriately set and a scanning locus of a magnetic head attached on the rotational drum agrees with a track formed on the magnetic tape. In this case, a reproduced image having no noise is obtained. Therefore, the number of increase/decrease changes in the shape of the envelope is detected as a shape value. In cases where the shape value is high, the inclination angle of the rotational drum is largely and repeatedly changed until the shape value becomes low. In contrast, in cases where the shape value is low, the inclination angle of the rotational drum is slightly and repeatedly changed until the envelope shape is flattened. Accordingly, any noise does not occur in the reproduced image regardless of whether a magnetic recording and reproducing apparatus is used in interchangeable reproduction or self-recording/reproduction.

6 Claims, 17 Drawing Sheets

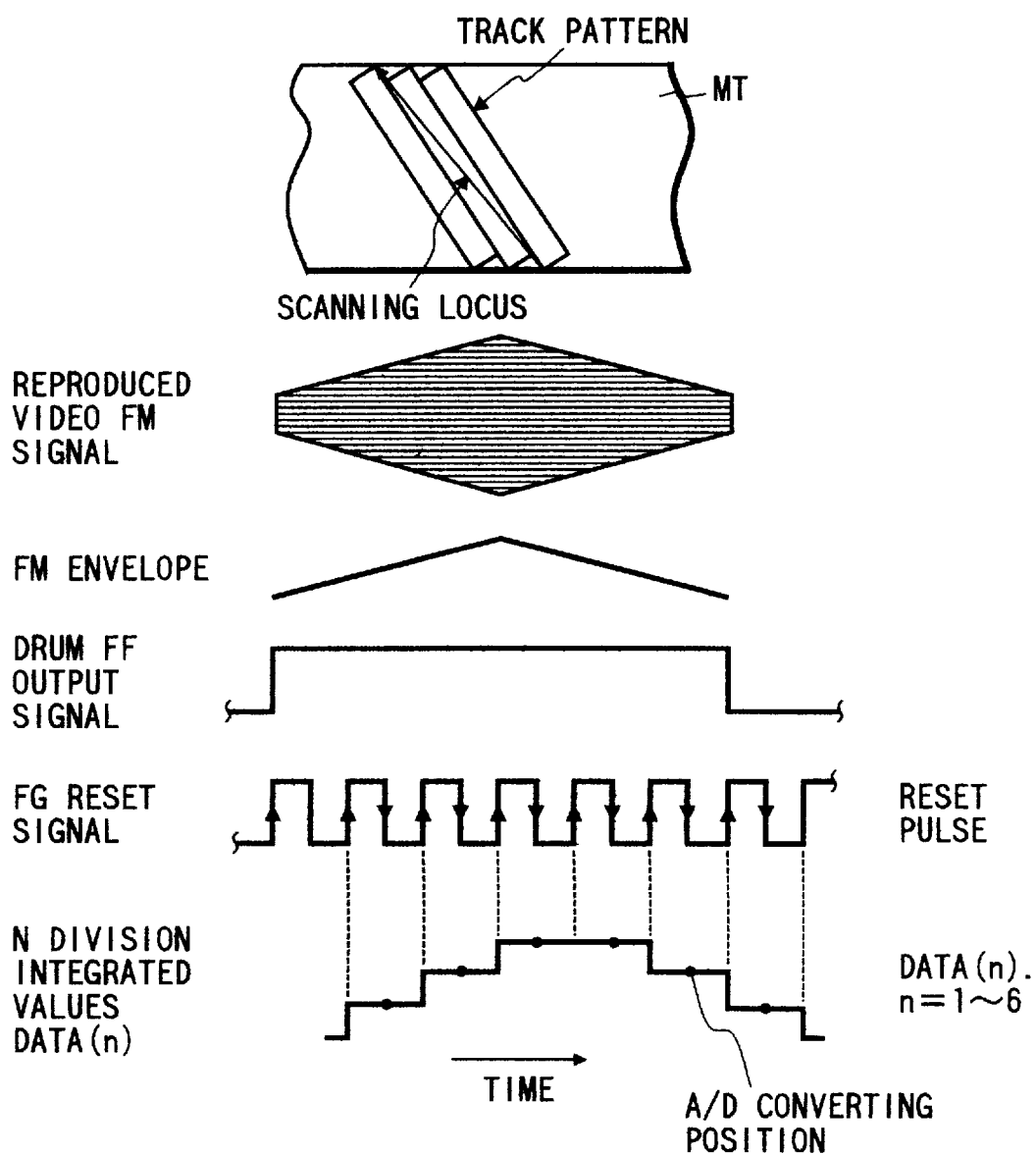

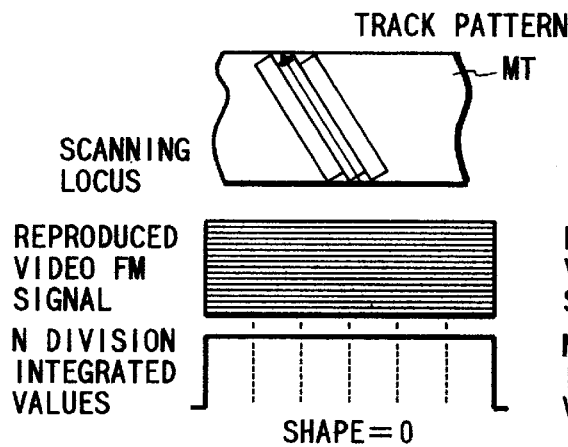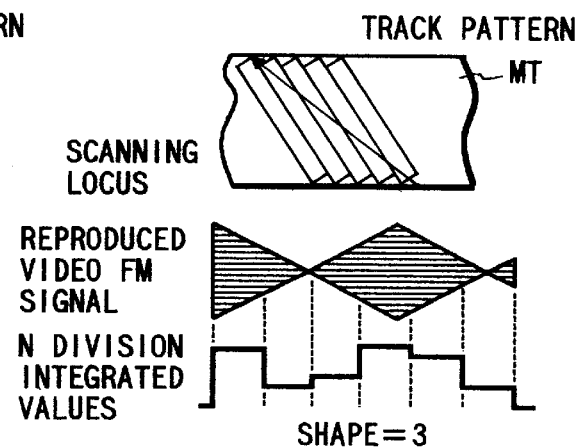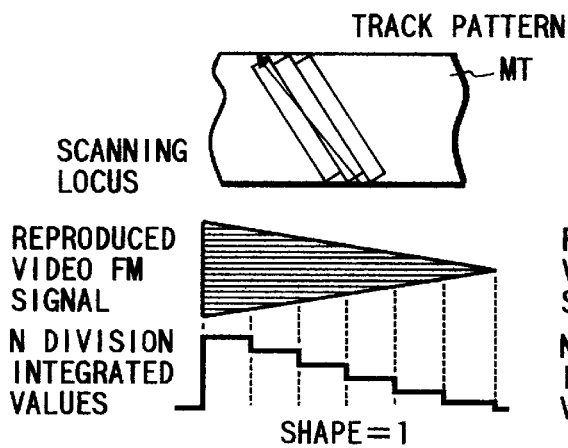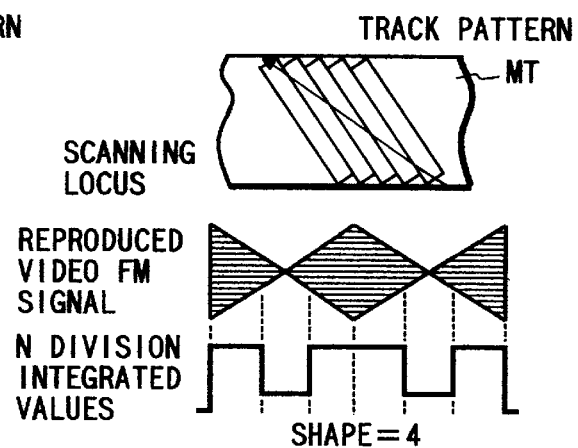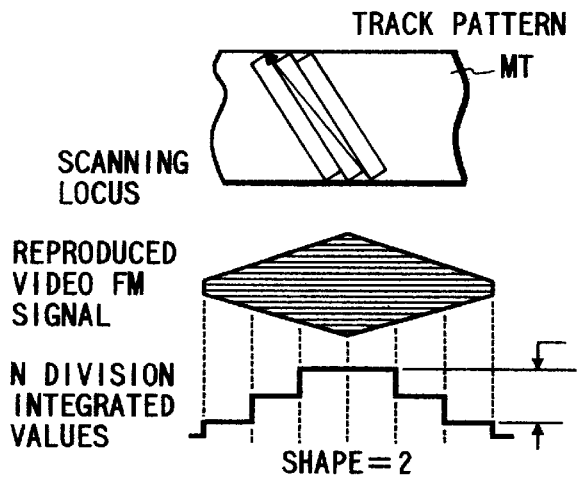

MAGNETIC RECORDING/REPRODUCING APPARATUS AND METHOD FOR CONTROLLING AN INCLINATION ANGLE OF A ROTATIONAL DRUM IN THE MAGNETIC RECORDING/REPRODUCING APPARATUS

BACKGROUND OF THE INVENTION

1. Field of the Invention

The present invention relates to a magnetic recording and reproducing apparatus for reproducing recorded data at a variable speed through a rotational head helically scanned and a method for controlling an inclination angle of a rotational drum on which the rotational head of the magnetic recording and reproducing apparatus is attached.

2. Description of the Related Art

In a helical scan type magnetic recording and reproducing apparatus represented by a household video tape recorder (VTR), recorded data is generally reproduced at a variable reproducing speed differing from a recording speed in a so-called variable speed reproducing mode. In this case, because the reproducing speed differs from the recording speed in a variable speed reproduction, a locus of a rotational magnetic head attached on a rotational drum on a magnetic tape does not accurately agree with a truck formed on the magnetic tape in a recording operation. Therefore, the track cannot be accurately traced by the magnetic head, and a quality of a reproduced signal is degraded. In particular, as the reproducing speed is heightened, the number of tracks crossed by the magnetic head is increased. As a result, a signal/noise (S/N) ratio is degraded, and noises formed in horizontal stripes occur in a reproduced image.

Also, in a VTR for business use used in a broadcasting station or the like (For example, No. BR-S525 in a VTR for business use manufactured by Vitor Company of Japan, Ltd.), an actuator embodied by a movable coil is attached to a rotational head to displace the rotational head for the purpose of solving the above drawbacks. However, because it is required that the actuator is placed inside a rotated drum, the configuration of the VTR is complicated, and the manufacturing of the VTR is not easy. In addition, the connection of an electric source for the actuator is not easy, a control circuit for controlling the actuator is required. Therefore, the VTR becomes expensive, the VTR is not used for a household apparatus.

2.1. Previously Proposed Art

Also, a method for inclining the whole rotational drum to displace the rotational head attached on the rotational drum is disclosed. However, an apparatus operated according to the method is not manufactured. The reason is that the technique for inclining the rotational drum is not sufficiently advanced and a signal processing technique in a feed-back system is not sufficiently advanced to accurately trace a track on a magnetic tape. In the Victor company of Japan, Ltd. relevant to the present inventor, a technique for accurately controlling an inclination of a rotational drum at a desired angle at a high responsibility has been developed, and two Japanese patent applications have been filed (the name of invention common for the applications: magnetic recording and reproducing apparatus, the filing date: Feb. 22, 1995, and Feb. 28, 1995). The applications have not been laid open, and the technique is not an opened prior art. A rotational drum operated according to the technique is called a dynamic drum. In detail, the dynamic drum is inclined by a rotational power generated by an inclination angle changing motor, and a rotational angle provided by the motor is controlled by a microcomputer. An inclination angle of the dynamic drum is detected by a counter in which a FG pulse signal generated in synchronization with the change of the rotational angle is counted. In addition, a sensor for generating a reset signal is provided to reset the counter when the dynamic drum is inclined at a predetermined inclination angle.

2.2. Problems to be Solved by the Invention

In cases where a variable speed reproduction in a VTR is performed according to the method for inclining the whole rotational drum or in cases where a variable speed reproduction in a VTR is performed by using the dynamic drum, a drum inclination angle corresponding to each of the recording tape speeds and each of the reproducing tape speeds is predetermined, and one of the drum inclination angles is selected. In this case, when a so-called self-recording/reproduction in which the recording and reproduction are performed in the same VTR is performed, one drum inclination angle can be properly selected, and the reproduction can be favorably performed. However, when a so-called interchangeable reproduction in which data recorded in a first VTR are reproduced in a second VTR differing from the first VTR is performed, because mechanical characteristics of a tape running system in the first VTR differ from those in the second VTR, a track pattern formed on a magnetic tape in the recording operation does not perfectly agree with a trace pattern formed on the magnetic tape in the reproducing operation. Therefore, there is a drawback that noises occur in a reproduced image.

Also, there is a case that an actual inclination angle of a rotational drum fluctuates from a predetermined inclination angle because of friction and/or abrasion occurring in a mechanical system for inclining the rotational drum. In cases where the actual inclination angle fluctuates, even though the self-recording/reproduction is performed, there is another drawback that the trace pattern does not agree with the track pattern unless the predetermined inclination angle is changed to compensate the fluctuation of the actual inclination angle.

SUMMARY OF THE INVENTION

A first object of the present invention is to provide, with due consideration to the drawbacks of such a conventional magnetic recording and reproducing apparatus and a conventional inclination angle control method, a magnetic recording and reproducing apparatus in which a track pattern formed on a magnetic tape in the recording operation perfectly agrees with a trace pattern formed on the magnetic tape by a magnetic head in the reproducing operation, and any noise does not occur in a reproduced image regardless of whether the apparatus is used in the interchangeable reproduction or the self-recording/reproduction, and to provide an inclination angle control method used in the magnetic recording and reproducing apparatus.

A second object of the present invention is to provide a magnetic recording and reproducing apparatus in which the inclination angle of a rotational drum is accurately and easily set to an appropriate inclination angle even though a recording tape speed characteristic for a particular magnetic recording and reproducing apparatus differs from that for another apparatus or the recording tape speed characteristic in one magnetic recording and reproducing apparatus changes.

The first object of the present invention is achieved by the provision of a magnetic recording and reproducing apparatus, comprising:

a rotational head for helically scanning a magnetic tape and reading out a reproduced signal from the magnetic tape;

a rotational drum on which the rotational head is mounted;

inclination angle changing means for changing an inclination angle of the rotational drum with respect to the magnetic tape to change a scanning direction of the rotational head with respect to the magnetic tape;

flatness detecting means for detecting a flatness degree of a variable level of the reproduced signal, in a predetermined period, read by the rotational head of which the scanning direction is changed by the inclination angle changing means;

inclination angle control means for controlling the inclination angle changing means to maximize the flatness degree of the variable level of the reproduced signal detected by the flatness detecting means; and signal processing means for processing the reproduced signal in which the flatness degree of the variable level is maximized by the inclination angle changing means under control of the inclination angle control means.

In the above configuration, when a reproduced signal is reproduced from the magnetic tape by the rotational head, a flatness degree of a variable level of the reproduced signal is detected by the flatness detecting means. Thereafter, the inclination angle changing means is controlled by the inclination angle control means to maximize the flatness degree. Therefore, an inclination angle of the rotational drum is changed under control of the inclination angle control means, and a scanning direction of the rotational head mounted on the rotational drum is changed to read out a following reproduced signal, in which a flatness degree of a variable level is maximized, from the magnetic tape through the rotational head.

Accordingly, a track pattern formed on the magnetic tape in a recording operation can perfectly agree with a trace pattern formed on the magnetic tape by the rotational head in a reproducing operation and any noise does not occur in a reproduced image regardless of whether the apparatus is used in the interchangeable reproduction or the self-recording/reproduction.

The first object of the present invention is also achieved by the provision of a method for controlling an inclination angle of a rotational drum on which a rotational head helically scanning a magnetic tape is mounted, comprising the steps of:

producing an envelope in a predetermined period from each of a plurality of reproduced signals read from the magnetic tape one after another by the rotational head;

detecting a changing degree of a shape of the envelope;

judging whether the changing degree is high or low;

largely changing the inclination angle of the rotational drum until the changing degree of the shape of the envelope becomes low in cases where it is judged that the changing degree is high;

slightly changing the inclination angle of the rotational drum until the changing degree of the shape of the envelope is minimized in cases where it is judged that the changing degree is low; and processing the reproduced signal from which the envelope of which the shape changing degree is minimized are produced.

In the above steps, a plurality of reproduced signals are read from the magnetic tape one after another by the rotational head, and an envelope is produced in a predetermined period from each of the reproduced signals.

In cases where a changing degree of a shape of the envelope is high, a large number of tracks formed on the magnetic tape in a recording operation is crossed by a scanning locus of the rotational head in a reproducing operation. In this case, the inclination angle of the rotational drum is largely changed to largely change a scanning direction of the rotational head. Therefore, the number of tracks crossed by the scanning locus of the rotational head is rapidly reduced.

In cases where a changing degree of a shape of the envelope is low, or in cases where a changing degree of a shape of the envelope is reduced to a low degree, the number of tracks crossed by the scanning locus of the rotational head is low. Therefore, the inclination angle of the rotational drum is slightly changed to slightly change a scanning direction of the rotational head, and the rotational head accurately scans a track when the changing degree is minimized.

Accordingly, when a reproduced image is produced by processing the reproduced signal from which the envelope of which the shape changing degree is minimized is obtained, any noise does not occur in the reproduced image regardless of whether the apparatus is used in the interchangeable reproduction or the self-recording/reproduction.

The first object of the present invention is also achieved by the provision of a method for controlling an inclination angle of a rotational drum on which a rotational head helically scanning a magnetic tape is mounted, comprising the steps of:

judging whether or not a magnetic tape traveling speed is changed to a particular magnetic tape traveling speed;

judging whether or not a particular inclination angle of the rotational drum appropriate to the particular magnetic tape traveling speed is known in cases where the magnetic tape traveling speed is changed to the particular magnetic tape traveling speed;

changing the inclination angle of the rotational drum to the particular inclination angle in cases where the particular magnetic tape traveling speed is known;

processing a plurality of reproduced signals read from the magnetic tape one after another by the rotational head mounted on the rotational drum of which the inclination angle is changed to the particular inclination angle;

producing an envelope in a predetermined period from each of a plurality of reproduced signals read from the magnetic tape one after another by the rotational head in cases where the particular magnetic tape traveling speed is not known;

detecting a changing degree of a shape of the envelope;

judging whether the changing degree is high or low;

largely changing the inclination angle of the rotational drum until the changing degree of the shape of the envelope becomes low in cases where it is judged that the changing degree is high;

slightly changing the inclination angle of the rotational drum until the changing degree of the shape of the envelope is minimized in cases where it is judged that the changing degree is low; and processing the reproduced signal from which the envelope of which the shape changing degree is minimized is produced.

In the above steps, in cases where the magnetic tape traveling speed is changed to a particular magnetic tape traveling speed in a reproducing operation, it is required to adjust the inclination angle of the rotational drum. In this case, complicated steps represented by the step of largely changing the inclination angle and the step of slightly changing the inclination angle are required to obtain a particular inclination angle of the rotational drum appropriate to the particular magnetic tape traveling speed. However, in cases where the particular inclination angle is known because the reproducing operation at the particular magnetic tape traveling speed has been already performed, the inclination angle of the rotational drum is easily changed to the particular inclination angle without performing the complicated steps.

Accordingly, the inclination angle of the rotational drum can be easily changed at high speed even though the magnetic tape traveling speed is changed.

The first object of the present invention is also achieved by the provision of a method for controlling an inclination angle of a rotational drum on which a rotational head helically scanning a magnetic tape is mounted, comprising the steps of:

judging whether or not a still reproduction is selected;

producing an envelope in a predetermined period from each of a plurality of reproduced signals read from the magnetic tape one after another by the rotational head;

detecting a changing degree of a shape of each of the envelopes;

judging whether each of the changing degrees is high or low;

largely changing the inclination angle of the rotational drum in a first direction each time it is judged that one of the changing degrees is high until one changing degree of one shape of one envelope becomes low;

slightly changing the inclination angle of the rotational drum in the first direction each time it is judged that one of the changing degrees is low until one changing degree of one shape of one envelope is minimized;

judging whether or not a level of each of the reproduced signals is decreased predetermined times in succession in cases where it is judged that the still reproduction is selected;

resetting the inclination angle of the rotational drum to an original inclination angle, which corresponds to the inclination angle of the rotational drum not largely changed by the step of largely changing the inclination angle or slightly changed by the step of slightly changing the inclination angle, in cases where it is judged that the level of each of the reproduced signals is decreased the predetermined times in succession;

producing a second envelope in the predetermined period from each of a plurality of reproduced signals read from the magnetic tape one after another by the rotational head after the inclination angle of the rotational drum is reset;

detecting a second changing degree of a shape of each of the second envelopes;

judging whether each of the second changing degrees is high or low;

largely changing the inclination angle of the rotational drum in a second direction opposite to the first direction each time it is judged that one of the second changing degrees is high until one second changing degree becomes low;

slightly changing the inclination angle of the rotational drum in the second direction each time it is judged that one of the second changing degrees is low until one second changing degree is minimized; and processing the reproduced signal from which the envelope of which the shape changing degree is minimized is produced.

In the above steps, in cases where a still reproduction is selected, there is a probability that a scanning locus of the rotational head is shifted from a center of a track. To prevent this drawback, it is judged whether or not a level of each of the reproduced signals is decreased predetermined times in succession because the level is decreased when a scanning locus is shifted from a center of a track. In cases where the level of each of the reproduced signals is decreased the predetermined times in succession, it is judged that a scanning locus is shifted from a center of a track, the inclination angle of the rotational drum is reset to an original inclination angle, and the rotational drum is inclined in the opposite direction.

Accordingly, because the rotational drum is inclined in both directions, a scanning locus of the rotational drum can reliably agree with a center of a track.

The second object of the present invention is achieved by the provision of a magnetic recording and reproducing apparatus, comprising:

a magnetic head for scanning a magnetic tape in a diagonal direction with respect to a width direction of the magnetic tape to record and reproduce a signal to/from a magnetic tape;

a rotational drum on which the magnetic head is mounted, a scanning direction of the magnetic head changing with an inclination angle of the rotational drum, and an inclination angle of the rotational drum appropriate for the scanning of the magnetic head being proportional to a reproducing tape speed;

rotational drum actuating means for actuating the rotational drum to incline the rotational drum, the rotational drum being not inclined in cases where an actuation degree of the rotational drum is within a non-sensitive zone, the rotational drum being inclined in cases where the actuation degree of the rotational drum exceeds an upper value of the non-sensitive zone, and an inclination angle of the rotational drum being proportional to an exceeding actuation degree defined as a difference between the actuation degree and the upper value of the non-sensitive zone;

storing means for storing a referential actuation degree corresponding to a referential reproducing tape speed, the referential actuation degree exceeding the upper value of the non-sensitive zone; and control means for detecting a current reproducing tape speed, calculating a differential actuation degree between a target actuating degree corresponding to the current reproducing tape speed and the referential actuation degree stored in the storing means, calculating a required actuation degree by adding the referential actuation degree and the differential actuation degree together, and controlling the rotational drum actuating means to actuate the rotational drum by the required actuation degree.

In the above configuration, the rotational drum actuated by the rotational drum actuating means is inclined in cases where the actuation degree of the rotational drum exceeds an upper value of the non-sensitive zone, and an inclination angle of the rotational drum is proportional to an exceeding actuation degree defined as a difference between the actuation degree and the upper value of the non-sensitive zone. Also, a scanning direction of the magnetic head change with the inclination angle of the rotational drum, and an inclination angle of the rotational drum appropriate for the scanning of the magnetic head changes in proportion to a reproducing tape speed.

Therefore, a referential actuation degree corresponding to a referential reproducing tape speed is stored in the storing means in advance. Thereafter, because an exceeding actuation degree defined as a difference between the actuation degree and the upper value of the non-sensitive zone is proportional to the reproducing tape speed, a differential actuation degree between a target actuating degree corresponding to a current reproducing tape speed and the referential actuation degree stored in the storing means is calculated from the current reproducing tape speed and the referential actuation degree corresponding to the referential reproducing tape speed. Thereafter, a required actuation degree is calculated by adding the referential actuation degree and the differential actuation degree together, and the rotational drum actuating means is controlled to actuate the rotational drum by the required actuation degree.

Therefore, the inclination angle of the rotational drum can be adjusted to an appropriate inclination angle appropriate for the scanning of the magnetic head.

Accordingly, the inclination angle of the rotational drum can be accurately and easily set to the appropriate inclination angle even though a non-sensitive zone for a particular magnetic recording and reproducing apparatus differs from that for another apparatus or the non-sensitive zone in one magnetic recording and reproducing apparatus changes.

BRIEF DESCRIPTION OF THE DRAWINGS

The objects, features and advantages of the present invention will be apparent from the following description taken in conjunction with the accompanying drawings, in which:

FIG. 5 shows an example of a tracing locus of one magnetic head scanning a recording pattern formed on a magnetic tape, a waveform of a reproduced video FM signal obtained by the scanning of the magnetic head, an FM envelope obtained by detecting a variable level of the reproduced video FM signal, one drum flip-flop output signal indicating one magnetic tape scanning period, an FG reset pulse signal and N division integrated values DATA(n) which are produced from the FM envelope, the drum flip-flop output signal and the FG reset pulse signal and are used for the calculation of the FM envelope shape;

FIG. 7A shows an example of N division integrated values DATA(n) from which a shape value SHAPE=0 is obtained as a judging result in the flow chart shown in FIG. 6;

FIG. 7B shows an example of N division integrated values DATA(n) from which a shape value SHAPE=1 is obtained as a judging result in the flow chart shown in FIG. 6;

FIG. 7C shows an example of N division integrated values DATA(n) from which a shape value SHAPE=2 is obtained as a judging result in the flow chart shown in FIG. 6;

FIG. 7D shows an example of N division integrated values DATA(n) from which a shape value SHAPE=3 is obtained as a judging result in the flow chart shown in FIG. 6;

FIG. 7E shows an example of N division integrated values DATA(n) from which a shape value SHAPE=4 is obtained as a judging result in the flow chart shown in FIG. 6;

DETAIL DESCRIPTION OF THE EMBODIMENTS

Preferred embodiments of a magnetic recording and reproducing apparatus and an inclination angle control method according to the present invention are described with reference to drawings.

Figure 1:
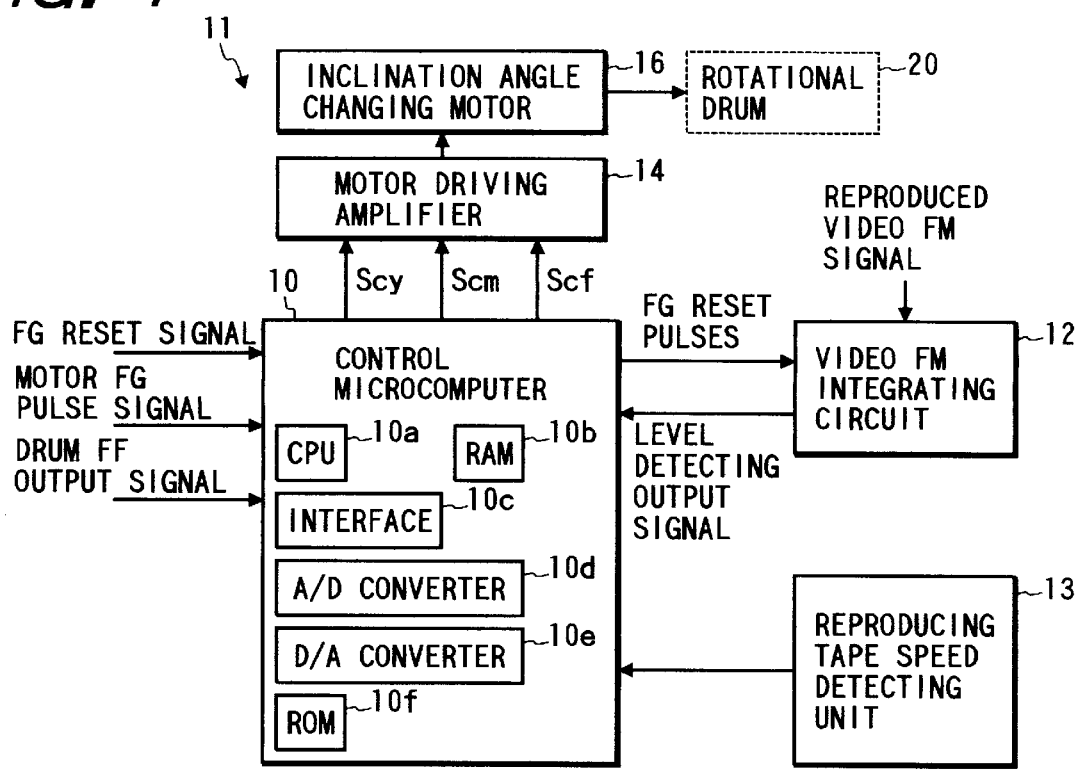
FIG. 1 is a block diagram of a dynamic drum inclination angle control system arranged in a magnetic recording and reproducing apparatus according to an embodiment of the present invention.
Figure 2:
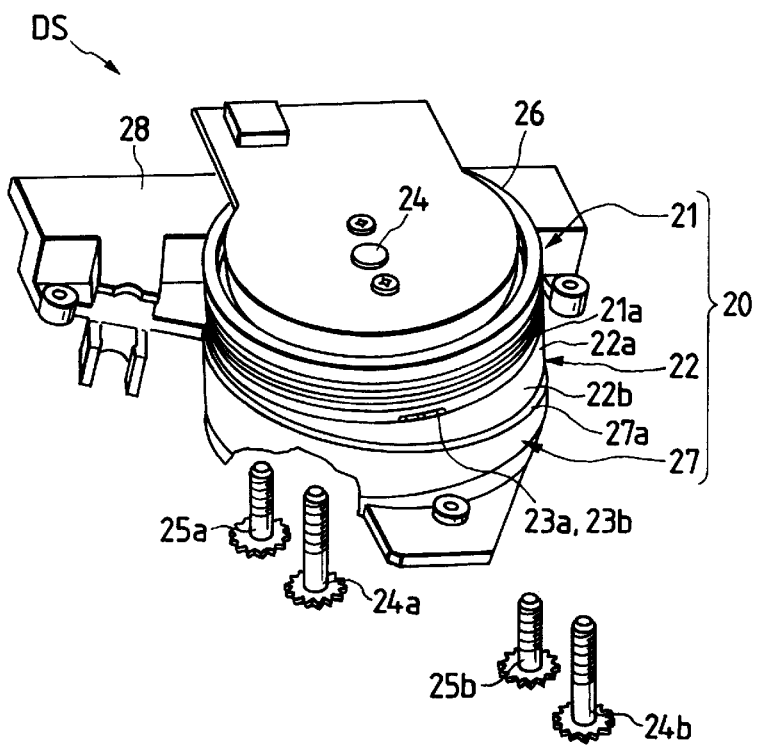
FIG. 2 is a diagonal view of a drum structure including a rotational drum arranged in the magnetic recording and reproducing apparatus.

FIG. 1 is a block diagram of a dynamic drum inclination angle control system for controlling an inclination angle of a rotational drum, on which a rotational magnetic head helically scanned is attached, in a magnetic recording and reproducing apparatus according to an embodiment of the present invention. FIG. 2 is a diagonal view of a drum structure DS including a rotational drum arranged in the magnetic recording and reproducing apparatus.

As shown in FIG. 1, a dynamic drum inclination angle control system 11 for controlling an inclination angle of a rotational drum comprises a video frequency-modulated (FM) integrating circuit 12 for integrating each of a plurality of reproduced video FM signals read out one by one from a magnetic tape MT according to FG reset pulses to detect a level (or amplitude) change of each reproduced video FM signal and outputting a level detecting output signal indicating the level change of each reproduced video FM signal. Also, a reproducing tape speed detecting unit 13 for detecting a current reproducing tape speed, a control microcomputer 10 for generating a motor speed control signal Scm, a motor front rotation control signal Scf and a motor reverse rotation control signal Scr from the level detecting output signal, a FG reset signal having the FG reset pulses, a motor FG pulse signal, a drum flip-flop output signal and the current reproducing tape speed to control the inclination angle of a rotational drum 20 shown in FIG. 2. Also, a motor driving amplifier 14 for generating a motor driving signal from the motor speed control signal Scm, the motor front rotation control signal Scf and the motor reverse rotation control signal Scr output from the control microcomputer 10, and an inclination angle changing motor 16 used as an actuating source for inclining the rotational drum according to the motor driving signal output from the motor driving amplifier 14 to change the inclination angle of the rotational drum 20. The control microcomputer 10 comprises a central processing unit 10a, a random access memory (RAM) 10b, an interface 10c, an analog/digital (A/D) converter 10d, a digital/analog converter 10e and a read only memory (ROM) 10f.

As shown in FIG. 2, in a drum structure DS, a drum axis 24 is inserted into a center portion of a lower drum 22 under pressure, and an upper drum 21 is coaxially supported by the drum axis 24 through a bearing put on the drum axis 24. A tape sliding surface 21a for leading a bound magnetic tape MT is formed at the periphery of the upper drum 21 at the same diameter with that of the upper drum 21, and a tape sliding surface 22a for leading the bound magnetic tape MT is formed at the periphery of the lower drum 22 at the same diameter with that of the lower drum 22. In the lower drum 22, a small diameter portion 22b having a diameter smaller than that of the tape sliding surface 22a is helically formed on a lower side of the tape sliding surface 22a. A pair of magnetic heads 23a and 23b are attached on the upper drum 21 opposite to each other, and the upper drum 21 is rotated around the drum axis 24 by an actuating power provided by a drum motor (not shown). On a lower side of the periphery of the lower drum 22, a leading ring 27 formed of a helical lead 27a is separately provided. The leading ring 27 leads a reference edge of the magnetic tape MT. Also, a drum base 28 is provided to support the lower drum 22, and a pair of screws 24a and 24b are screwed into the drum base 28 to attach the lower drum 22 to the drum base 28 under pressure. The screw 24a is placed on a 0 degree side, and the screw 24b is placed on a 180 degree side. A rotational drum 20 is composed of the upper and lower drum 21 and 22 and the leading ring 27.

The screws 24a and 24b has a function for correcting an inclination of the whole rotational drum 20. In detail, in a fast feed (FF) reproducing mode operation, a location pin (not shown) for the 0 degree side is pressed up by a tip of the screw 24a, a 0 degree side bottom portion of the lower drum 22 is pressed up, the upper and lower drums 21 and 22 supported by the drum axis 24 are rotationally moved with the leading ring 27 by a whole drum inclination correcting angle $\theta$ in a clockwise direction with respect to the drum base 28, and the inclination of the rotational drum 20 in the FF reproducing mode operation is corrected. In contrast, in a fast back-feed (FB) reproducing mode operation, another location pin (not shown) for the 180 degree side is pressed up by a tip of the screw 24b, a 180 degree side bottom portion of the lower drum 22 is pressed up, the upper and lower drums 21 and 22 supported by the drum axis 24 are rotationally moved with the leading ring 27 by a whole drum inclination correcting angle $\theta$ in a counterclockwise direction with respect to the drum base 28, and the inclination of the rotational drum 20 in the FB reproducing mode operation is corrected.

The screws 25a and 25b are screwed into the leading ring 27 to attach the leading ring 27 to the lower drum 22 under pressure. The screw 25a is placed on the 0 degree side, and the screw 25b is placed on the 180 degree side. The screws 25a and 25b have a function for correcting an inclination of a track formed on the magnetic tape MT. In detail, in the FF reproducing mode operation, when a pin (not shown) for the 0 degree side is pressed up by a tip of the screw 25a, though a 0 degree side bottom portion of the leading ring 27 is pressed down by a track inclination correcting angle $\theta 1$ with respect to the lower drum 22, the 0 degree side bottom portion of the leading ring 27 are rotationally moved in the clockwise direction with respect to the drum base 28, and the inclination of the track in the FF reproducing mode operation is corrected. In contrast, in the FB reproducing mode operation, another pin (not shown) for the 180 degree side is pressed up by a tip of the screw 25b, a 180 degree side bottom portion of the leading ring 27 is pressed down by a track inclination correcting angle $\theta 1$ with respect to the lower drum 22, the 0 degree side bottom portion of the leading ring 27 are rotationally moved in the counterclockwise direction with respect to the drum base 28, and the inclination of the track in the FB reproducing mode operation is corrected.

Therefore, the combination of the screws 24a and 24b functions as a whole drum correction actuating means for rotationally moving the upper and lower drums 21 and 22 supported by the drum axis 24 with the leading ring 27 with respect to the drum base 28 in the FF reproducing mode operation and the FB reproducing mode operation. Also, the combination of the screws 25a and 25b functions as a track inclination correction actuating means for successively inclining the drum axis 24 with respect to an imaginary central axis of the leading ring 27 according to a traveling speed of the magnetic tape MT to make a track pattern formed on the magnetic tape MT agree with rotational loci of the magnetic heads 23a and 23b formed on the magnetic tape MT in the FF reproducing mode operation and the FB reproducing mode operation. Also, the cooperative configuration of the combination of the screws 24a and 24b and the combination of the screws 25a and 25b functions as a lead correction actuating means for successively inclining the imaginary central axis of the leading ring 27 to make the helical lead 27a agree with a reference edge of the magnetic tape MT.

Figure 3:
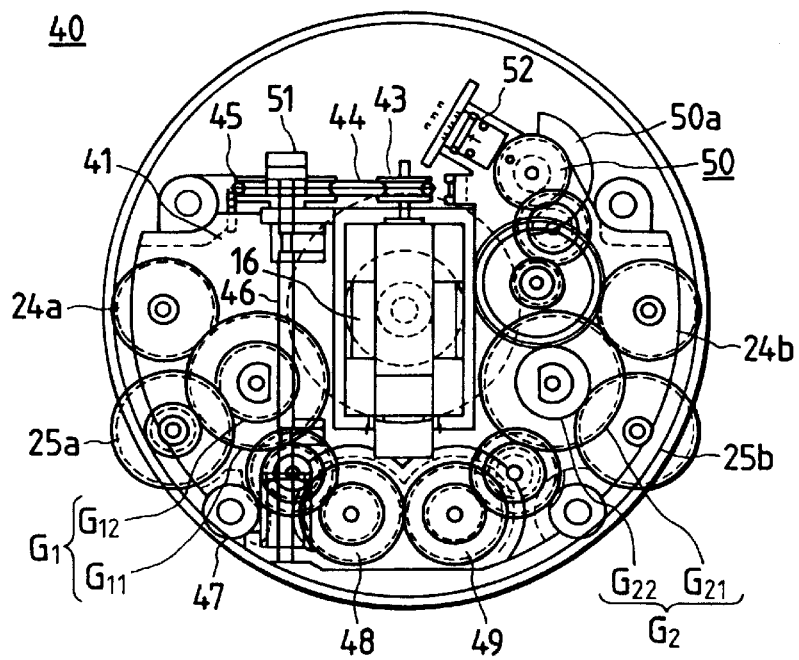
FIG. 3 is a plan view showing an internal configuration of the rotational drum shown in FIG. 2.

Next, an actuating means in which the screws 24a and 24b rotationally moving the lower drum 22 and the screws 25a and 25b rotationally moving the leading ring 27 are rotationally and simultaneously actuated by the inclination angle changing motor 16 is described in brief with reference to FIG. 3.

FIG. 3 is a plan view showing an internal configuration of the rotational drum 20 shown in FIG. 2.

As shown in FIG. 3, a supporting base 41 to which an actuating means 40 is attached is provided on a back surface side of the drum base 28. The rotation of a first pulley 43 which is fixedly attached to an axis of the motor 16 placed on the supporting base 41 is transmitted though a belt 44 to a worm 47 attached on an axis 46 to which a second pulley 45 is attached. Thereafter, the rotation of the worm 47 is transmitted to a first helical gear 48 engaged with the worm 47, and the rotation of the first helical gear 48 is transmitted to a second helical gear 49 engaged with the first helical gear 48. In this case, a rotational direction of the first helical gear 48 is opposite to that of the second helical gear 49.

The first helical gear 48 is connected to a two speed gear $G_1$ composed of a larger diameter gear portion $G_{11}$ and a smaller diameter gear portion $G_{12}$ and functions to rotate the screw 24a engaged with the larger diameter gear portion $G_{11}$ and the screw 25a engaged with the smaller diameter gear portion $G_{12}$. Also, the second helical gear 49 is connected to a two speed gear $G_2$ composed of a larger diameter gear portion $G_{21}$ and a smaller diameter gear portion $G_{22}$ and functions to rotate the screw 24b engaged with the larger diameter gear portion $G_{21}$ and the screw 25b engaged with the smaller diameter gear portion $G_{22}$. Therefore, the rotation of the screws 24a and 25a is opposite to that of the screws 24b and 25b. In addition, the rotation of the two speed gear $G_2$ connected to the second helical gear 49 is transmitted to a reset gear 50 through a series of gears. The rotation of the reset gear 50 is reduced to rotate the reset gear 50 in a range of about ±180 degrees. In this case, because the screws 24a and 24b are engaged with the larger diameter gear portions $G_{11}$ and $G_{21}$ of the two speed gears $G_1$ and $G_2$, the screws 24a and 24b for correcting the inclination of the whole rotational drum 20 are rotated by the motor 16 in a high degree according to a whole drum inclination angle correcting characteristic to rotate the upper and lower drums 21 and 22 by the whole drum inclination correcting angle θ. In contrast, because the screws 25a and 25b are engaged with the smaller diameter gear portions $G_{12}$ and $G_{22}$ of the two speed gears $G_1$ and $G_2$, the screws 25a and 25b for correcting the inclination of the track formed on the magnetic tape MT are rotated by the motor 16 at a low degree according to a lead inclination angle correcting characteristic to rotate the bottom portion of the leading ring 27 by a lead inclination correcting angle θ2 obtained by subtracting the track inclination correcting angle θ1 from the whole drum inclination correcting angle θ.

A plurality of (for example, three) fan-shaped shielding plates (not shown) are attached to the second pulley 45. Therefore, when the motor 16 is driven, a beam of light is intermittently shielded by the shielding plates, the light intermittently shielded is detected by a photo-electro sensor 51, and the FG pulse signal is generated by the sensor 51.

A fan-shaped shielding plate 50a spread about 180 degrees is attached to the reset gear 50. Therefore, when the rotational drum 20 is inclined at an inclination angle corresponding to a standard speed recording operation, an edge of the shielding plate 50a is detected by a photo-electro sensor 52, and the FG reset signal is generated by the photo-electro sensor 52.

In the control microcomputer 10, a motor FG pulse signal occurring each time a rotor of the inclination angle changing motor 16 is rotated, is added to a current FG pulse counting value when the rotation caused by the inclination angle changing motor 16 is directed in a plus direction according to the motor front rotation control signal Scf, and the motor FG pulse signal is subtracted from the current FG pulse counting value when the rotation caused by the inclination angle changing motor 16 is directed in a minus direction according to the motor reverse rotation control signal Scr. Therefore, the current FG pulse counting value indicates a current inclination angle of the rotational drum 20 actuated according to the rotation of the rotor of the inclination angle changing motor 16. The current inclination angle is defined as a differential angle between a referential angle of the rotational drum 20 placed at a reference point and a current (or actual) angle of the rotational drum 20. The current FG pulse counting value is reset to zero by the FG reset signal. The drum flip-flop (FF) output signal indicates a magnetic tape MT scanning period of the scanning performed by the magnetic heads 23a and 23b which are attached to the rotational drum 20 in opposite to each other, and the magnetic tape MT scanning period agrees with a vertical scanning period (or a field) of a video signal. In the control microcomputer 10, a desired inclination angle of the rotational drum 20 is calculated according to a level detecting output signal which indicates a level of a reproduced video FM signal and is output from the video FM integrating circuit 12, the motor drive amplifier 14 is controlled, and the inclination angle changing motor 16 is driven. Also, in the control microcomputer 10, a differential angle between the referential angle and the current angle of the rotation al drum 20 is stored as a current inclination angle and i s indicated by the current FG pulse counting value, direction and angle of the rotation caused by the inclination angle changing motor 16 are determined to reduce a difference between a desired (or a target) FG pulse counting value corresponding to a desired (or a target) inclination angle and the current FG pulse counting value to zero, and the motor drive amplifier 14 is controlled to apply an appropriate voltage to the inclination angle changing motor 16. In other words, when the current FG pulse counting value indicating the actual inclination angle agrees with the target FG pulse counting value indicating the target inclination angle, the operation of the inclination angle changing motor 16 is stopped.

In addition, in the control microcomputer 10, N division integrated values (N is an integral number higher than 1) indicated by the level detecting output signal output from the video FM integrating circuit 12 is received, each of vertical scanning periods of the reproduced video signal is divided into N scanning sub-periods, the shape change of FM envelope in the N scanning sub-periods is judged, a changing width (or a changing degree) of the FM envelope is detected, the inclination angle changing motor 16 is controlled to reduce the changing width according to the shape change, and the inclination angle of the rotational drum 20 is controlled. In this case, the judgement of the FM envelope shape change is performed by detecting a flat degree of the level of the reproduced video FM signal, and it is judged to what degree a trace pattern of the magnetic heads in the reproducing operation agrees with a track pattern formed on the magnetic tape MT in the recording operation.

Figure 4A:
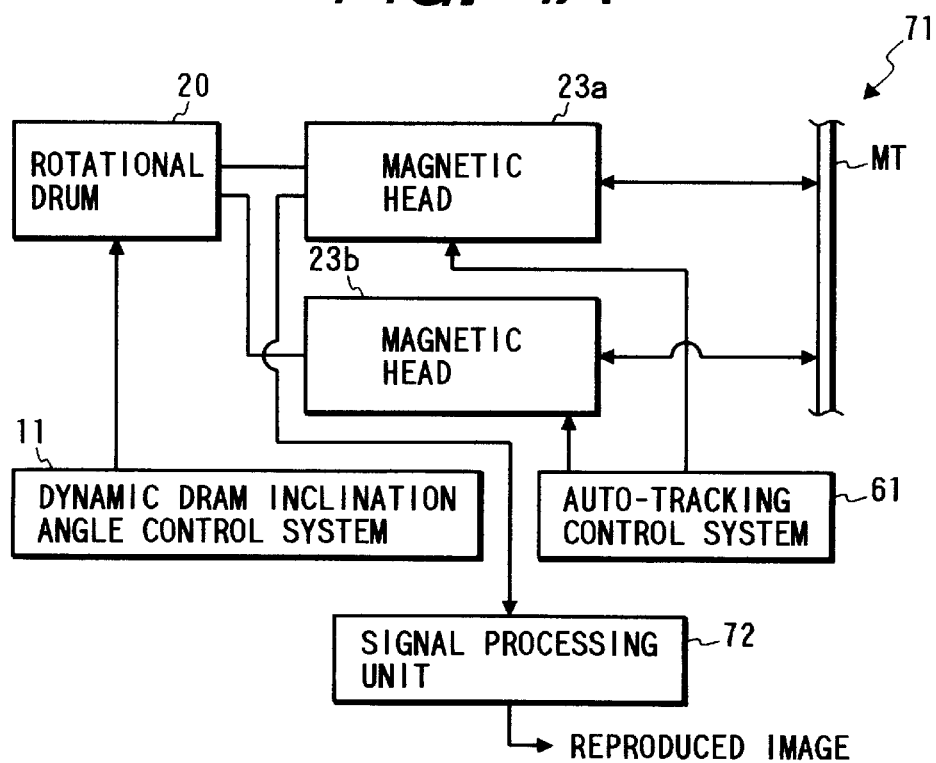
FIG. 4A is a block diagram of a magnetic recording and reproducing apparatus according to the present invention.

FIG. 4A is a block diagram of a magnetic recording and reproducing apparatus according to the present invention.

Figure 11:
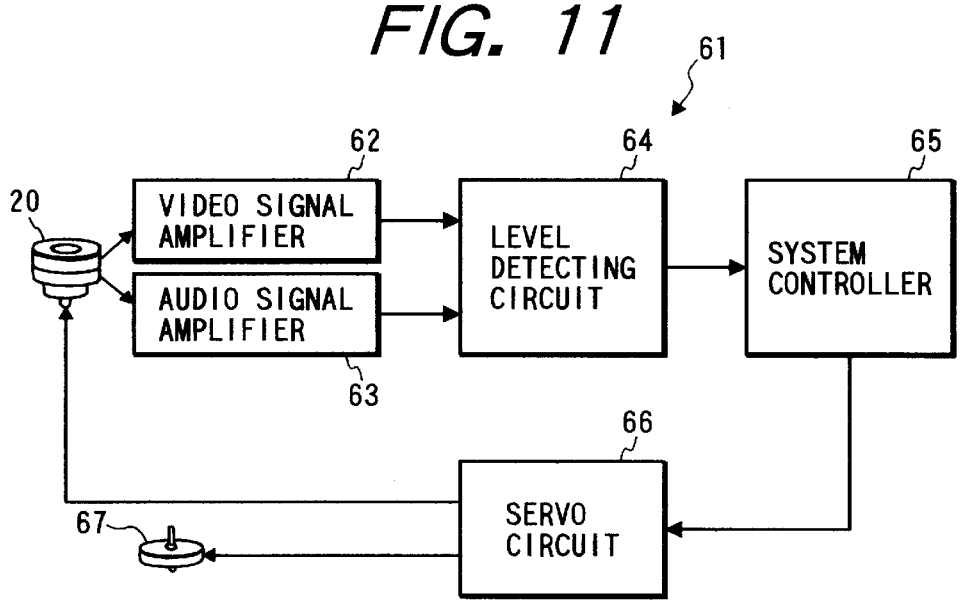
FIG. 11 is a block diagram of an auto-tracking control system arranged in the magnetic recording and reproducing apparatus.

As shown in FIG. 4A, a magnetic recording and reproducing apparatus 71 comprises the rotational magnetic heads 23a and 23b for helically scanning the magnetic tape MT and reading out a plurality of reproduced signals one after another from the magnetic tape MT, the rotational drum 20 on which the rotational magnetic heads 23a and 23b are attached, the dynamic drum inclination angle control system 11 for controlling the inclination angle of the rotational drum 20, an auto-tracking control system 61 shown in FIG. 11 for performing an auto-tracking control to set a scanning locus of each of the rotational magnetic heads 23a and 23b at a center of a track formed on the magnetic tape MT, and a signal processing unit 72 for processing a plurality of reproduced signals read out by the rotational magnetic heads 23a and 23b which are controlled by the dynamic drum inclination angle control system 11 and the auto-tracking control system 61 and producing a produced image.

The inclination angle changing motor 16 and the motor drive amplifier 14 of the dynamic drum inclination angle control system 11 and the actuating means 40 function as an inclination angle changing means for changing the inclination angle of the rotational drum 20 with respect to the magnetic tape MT to change a scanning direction of each of the rotational heads 23a and 23b.

Next, a procedure of the control performed in the control microcomputer 10 in a reproducing operation is described with reference to FIG. 4B.

Figure 4B:
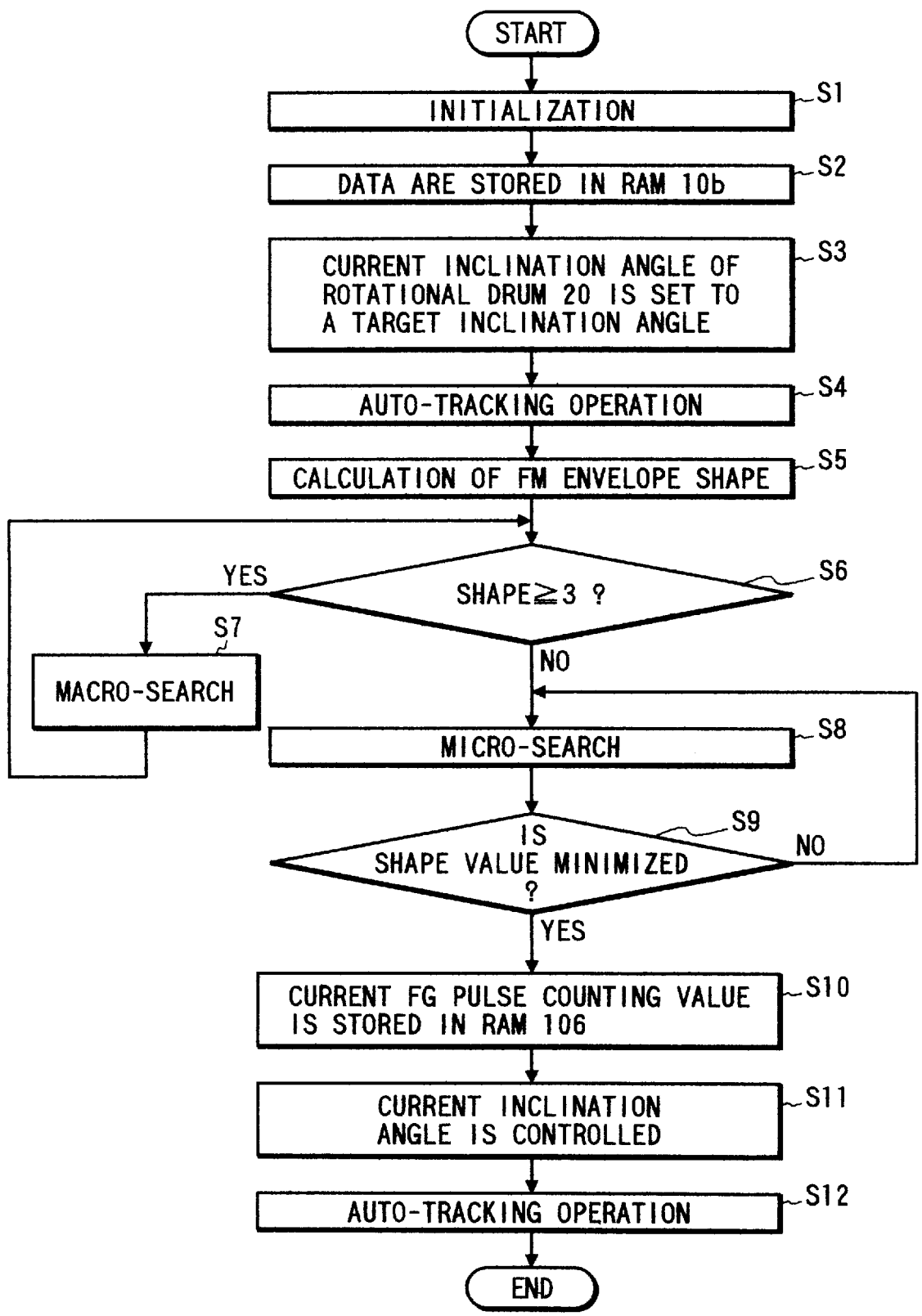
FIG. 4B is a flow chart showing an inclination angle control method according to a first embodiment of the present invention.

FIG. 4B is a flow chart showing an inclination angle control method according to a first embodiment of the present invention.

As shown in FIG. 4B, the RAM 10b of the control microcomputer 10 is initialized in a step S1. In a step S2, a level detecting output signal output from the video FM integrating circuit 12 is stored in the RAM 10b, and a current pulse counting value calculated from the motor FG pulse signals which indicates the current inclination angle is stored in the RAM 10b. Also, a plurality of target pulse counting values respectively corresponding to a reproducing tape speed are stored in the ROM 10f. In a step S3, a particular target pulse counting value corresponding to a current reproducing tape speed detected by the reproducing tape speed detecting unit 13 is selected from among the target pulse counting values stored in the ROM 10f and is transferred to the CPU 10a. In the CPU 10a, two control signals Scm and Scf or two control signals Scm and Scr are produced according to the particular target pulse counting value, the FG reset signal, the motor FG signal and the drum FF output signal and is transmitted to the motor drive amplifier 14 to set the current inclination angle of the rotational drum 20 to a target inclination angle corresponding to the current reproducing tape speed in an open loop. In a step S4, an auto-tracking operation is performed, and tracking data is stored in the RAM 10b. The auto-tracking operation is described later with reference to FIG. 11. In a step S5, a shape of an FM envelope obtained from one reproduced video FM signal is calculated by using the N division integrated values, and a shape value is obtained. The shape value denotes the number of increase/decrease changes of the FM envelope. The calculation of the FM envelope shape is described later in detail with reference to FIG. 6.

In a step S6, it is judged whether or not the shape value is equal to or higher than 3. In cases where the shape value is equal to or higher than 3, it is judged that the number of tracks crossed by one magnetic head 23a or 23b in one vertical scanning period is too high, and a control for largely changing the current inclination angle of the rotational drum 20 is performed in a step S7. This control is called a macro-search. After the step S7, the step 6 is again performed, and the step S7 is repeated until the shape value is decreased to 1 or 2. In contrast, in cases where the shape value is not equal to or higher than 3, a control for slightly changing the current inclination angle of the rotational drum 20 is performed in a step S8. This control is called a micro-search. After the step S8, it is judged in a step S9 whether or not a changing degree of the FM envelope is minimized. That is, it is judged whether or not the shape value in one vertical scanning period is minimized to zero. In cases where the shape value in one vertical scanning period is not minimized, the step S8 is repeated until the change of the FM envelope value is minimized. In contrast, in cases where it is judged in the step S9 that the shape value in one vertical scanning period is minimized, the current FG pulse counting value obtained in the CPU 10a is stored in the RAM 10b in a step S10. In a step S11, the current inclination angle of the rotational drum 20 is controlled according to the current FG pulse counting value. Thereafter, the auto-tracking is again performed in a step S12, and tracking data is stored in the RAM 10b.

Next, the calculation of the FM envelope shape is described with reference to FIGS. 5 and 6.

FIG. 5 shows an example of a tracing locus of one magnetic head scanning a recording pattern formed on the magnetic tape MT, a waveform of a reproduced video FM signal obtained by the scanning of the magnetic head, an FM envelope obtained by detecting a variable level of the reproduced video FM signal, one drum flip-flop output signal indicating one magnetic tape MT scanning period, an FG reset pulse signal and N division integrated values DATA(n) which are produced from the FM envelope, the drum flip-flop output signal and the FG reset pulse signal and are used for the calculation of the FM envelope shape.

As shown in FIG. 5, each of the vertical scanning periods is divided into six sub-periods (N=6), and DATA(n) indicates a piece of n-th quantized data.

The six division integrated values DATA(n) are obtained by converting a variable level of the reproduced video FM signal in one vertical scanning period into a direct current voltage (or an FM envelope) corresponding to the variable level, dividing the direct current voltage into six divided voltages respectively corresponding to ⅙ of one vertical scanning period, integrating each of the divided voltages for ⅙ of one vertical scanning period, holding each of six integrated voltages in a holding circuit and outputting the integrated voltages. Six divided integrating operations for the divided voltages are performed by resetting an integrating operation six times in synchronization with six reset pulses of the FG reset pulse signal. The reset pulses are obtained by counting one vertical scanning period ranging from a leading edge to a trailing edge in the drum flip-flop output signal by means of a free-run counter placed in the control microcomputer 10 and outputting six square waves in one vertical scanning period. The integrating operation is reset in synchronization with six leading edges of the reset pulses. Also, the integrated voltages are quantized by performing six A/D converting operations for the integrated voltages in synchronization with six trailing edges of the reset pulses, and six pieces of quantized voltage data are stored in the RAM 10b of the control microcomputer 10 as the division integrated values DATA(n). In this case, to prevent an erroneous detection of the variable level of the reproduced video FM signal caused by a sudden change of the variable level, each of integrating operations for a plurality of FM envelopes is performed on condition that each of drum flip-flop output signals is set to a high level. In other words, the integrating operations are repeatedly performed for a plurality of reproduced video FM signals transmitted through the same magnetic head 23a or 23b, and each of the six quantized voltage data is stored in an adder of the control microcomputer 10 for each of the reproduced video FM signals to perform a synchronization adding operation for each of the six quantized voltage data.

Figure 6:
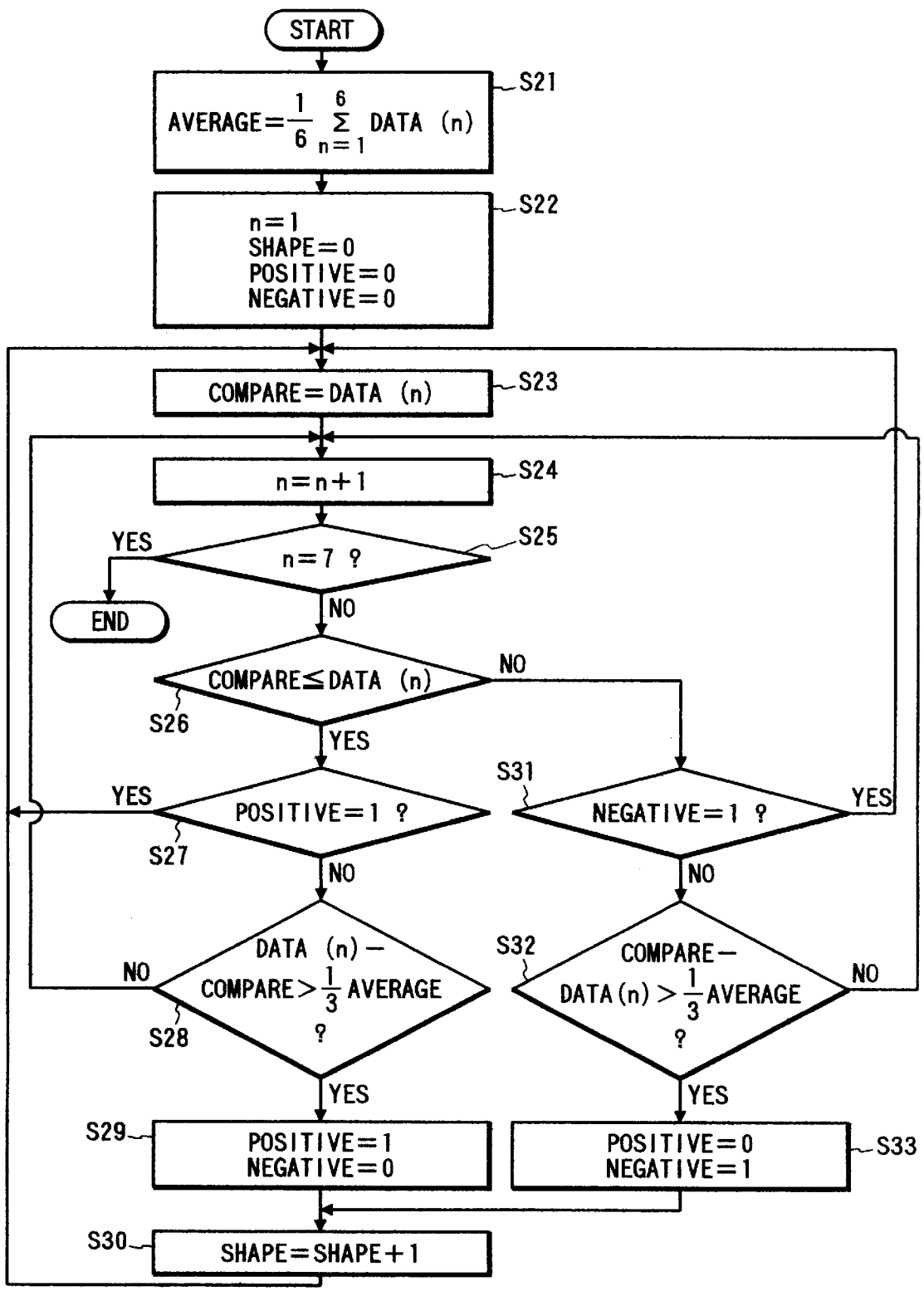
FIG. 6 is a flow chart showing a procedure of the calculation of the FM envelope shape performed in a step S5 shown in FIG. 4B.

FIG. 6 is a flow chart showing a procedure of the calculation of the FM envelope shape performed in the CPU 10a of the control microcomputer 10 in the step S5 shown in FIG. 4B.

As shown in FIG. 6, in a step S21, an average value AVERAGE of six quantized data DATA(n) is calculated. In a step S22, a number n is initially set to 1, a shape value SHAPE indicating a degree of the change of the FM envelope shape is initially set to 0, a positive flag POSITIVE is initially set to 0, and a negative flag NEGATIVE is initially set to 0. In cases where one magnetic head correctly traces a track of a recording track pattern formed on the magnetic tape MT, the shape value SHAPE is maintained to 0. As the number of tracks crossed by one magnetic head in one vertical scanning period is increased, the shape value SHAPE is increased. The positive flag POSITIVE is set to 1 in cases where one quantized data DATA(n) is equal to or higher than a compared reference value. The negative flag NEGATIVE is set to 1 in cases where one quantized data DATA(n) is lower than the compared reference value.

In the calculation of the FM envelope shape, in cases where a differential value DATA(n)–DATA(n–i) (i<n) (or a differential value DATA(n–i)–DATA(n)) is higher than $1/3*$AVERAGE on condition that the latest increment of the shape value SHAPE is not caused by the increase (or decrease) of the FM envelope, it is judged that the shape of the FM envelope is changed and the increment of the shape value SHAPE is required.

In a step S23, a piece of quantized data DATA(n) is set as a compared value COMPARE. That is, the compared value COMPARE agreeing with the quantized data DATA(1) is initially set. In a step S24, the number n is incremented. In a step S25, it is judged whether or not the number n is equal to 7 higher than the number N. In cases where the number n is lower than 7, it is judged in a step S26 whether or not another piece of quantized data DATA(n) is equal to or higher than the compared value COMPARE.

In cases where the quantized data DATA(n) is equal to or higher than the compared value COMPARE, it is judged that the FM envelope is changed in a increasing direction. Thereafter, it is judged in a step S27 whether or not the positive flag POSITIVE is equal to 1. In cases where the positive flag POSITIVE is equal to 1, it is judged that the increment of the shape value SHAPE caused by the decrease of the FM envelope has not been performed since the shape value SHAPE is incremented because of the increase of the FM envelope. In this case, even though the FM envelope is greatly increased and a differential value DATA(n)–COMPARE is higher than $1/3*$AVERAGE, it is not required to increment the shape value SHAPE. Therefore, the procedure returns to the step S23, and the compared value COMPARE is renewed. In contrast, in cases where the positive flag POSITIVE is not equal to 1 in the step S27, it is judged that the latest increment of the shape value SHAPE is not caused by the increase of the FM envelope. Thereafter, the procedure proceeds to a step S28. In the step S28, it is judged whether or not a differential value DATA(n)–COMPARE is higher than a value $1/3*$AVERAGE. In cases where the differential value DATA(n)–COMPARE is not higher than the value $1/3*$AVERAGE, it is judged that the increment of the shape value SHAPE is not required even though the FM envelope is increasing on condition that the latest increment of the shape value SHAPE is not caused by the increase of the FM envelope. Thereafter, the procedure returns to the step S24, and the number n is incremented. In contrast, in cases where the differential value DATA(n)–COMPARE is higher than the value $1/3*$AVERAGE in the step S28, it is judged that the increment of the shape value SHAPE is required, and the procedure proceeds to a step S29. In the step S29, the positive flag POSITIVE is set to 1, and the negative flag NEGATIVE is set to 0. Thereafter, the shape value SHAPE is incremented in a step S30, and the procedure returns to the step S23 to renew the compared value COMPARE.

In contrast, in cases where the quantized data DATA(n) is lower than the compared value COMPARE in the step S26, it is judged that the FM envelope is changed in a decreasing direction. Thereafter, it is judged in a step S31 whether or not the negative flag NEGATIVE is equal to 1. In cases where the negative flag NEGATIVE is equal to 1, it is judged that the increment of the shape value SHAPE caused by the increase of the FM envelope has not been performed since the shape value SHAPE is incremented because of the decrease of the FM envelope. In this case, even though the FM envelope is greatly decreased and a differential value COMPARE–DATA(n) is higher than $1/3*$AVERAGE, it is not required to increment the shape value SHAPE. Therefore, the procedure returns to the step S23, and the compared value COMPARE is renewed. In contrast, in cases where the negative flag NEGATIVE is not equal to 1 in the step S31, it is judged that the latest increment of the shape value SHAPE is not caused by the decrease of the FM envelope. Thereafter, it is judged in a step S32 whether or not the differential value COMPARE–DATA(n) is higher than the value $1/3*$AVERAGE. In cases where the differential value COMPARE–DATA(n) is not higher than the value $1/3*$AVERAGE, it is judged that the increment of the shape value SHAPE is not required even though the FM envelope is decreasing on condition that the latest increment of the shape value SHAPE is not caused by the decrease of the FM envelope. Thereafter, the procedure returns to the step S24, and the number n is incremented. In contrast, in cases where the differential value COMPARE–DATA(n) is higher than the value $1/3*$AVERAGE, it is judged that the increment of the shape value SHAPE is required, and the procedure proceeds to a step S33. In the step S33, the positive flag POSITIVE is set to 0, and the negative flag NEGATIVE is set to 1. Thereafter, the procedure proceeds to the step S30, and the shape value SHAPE is incremented.

Accordingly, even though the FM envelope is increased (or decreased) after the shape change of the FM envelope caused by the increase (decrease) of the FM envelope is judged, the shape change of the FM envelope is not judged.

Also, any fixed value is not used to judge whether or not the FM envelope is considerably increased (or decreased), but the value ⅓*AVERAGE is used. Therefore, the judgement of the FM envelope change corresponding to the level of the FM envelope in one vertical scanning period can be performed, and an erroneous judgement caused by a low level change of the FM envelope can be prevented.

An example of N division integrated values DATA(n) from which the shape value SHAPE=0 is obtained as a judging result in the flow chart shown in FIG. 6 is shown in FIG. 7A, an example of N division integrated values DATA (n) from which the shape value SHAPE=1 is obtained as a judging result in the flow chart shown in FIG. 6 is shown in FIG. 7B, an example of N division integrated values DATA (n) from which the shape value SHAPE=2 is obtained as a judging result in the flow chart shown in FIG. 6 is shown in FIG. 7C, an example of N division integrated values DATA (n) from which the shape value SHAPE=3 is obtained as a judging result in the flow chart shown in FIG. 6 is shown in FIG. 7D, and an example of N division integrated values DATA(n) from which the shape value SHAPE=4 is obtained as a judging result in the flow chart shown in FIG. 6 is shown in FIG. 7E. The shape value SHAPE=1 is obtained in cases where one magnetic head crosses two tracks in one vertical scanning period, the shape value SHAPE=2 is obtained in cases where one magnetic head crosses three tracks in one vertical scanning period, the shape value SHAPE=3 is obtained in cases where one magnetic head crosses four tracks in one vertical scanning period, and the shape value SHAPE=4 is obtained in cases where one magnetic head crosses five tracks in one vertical scanning period.

Figure 8A:
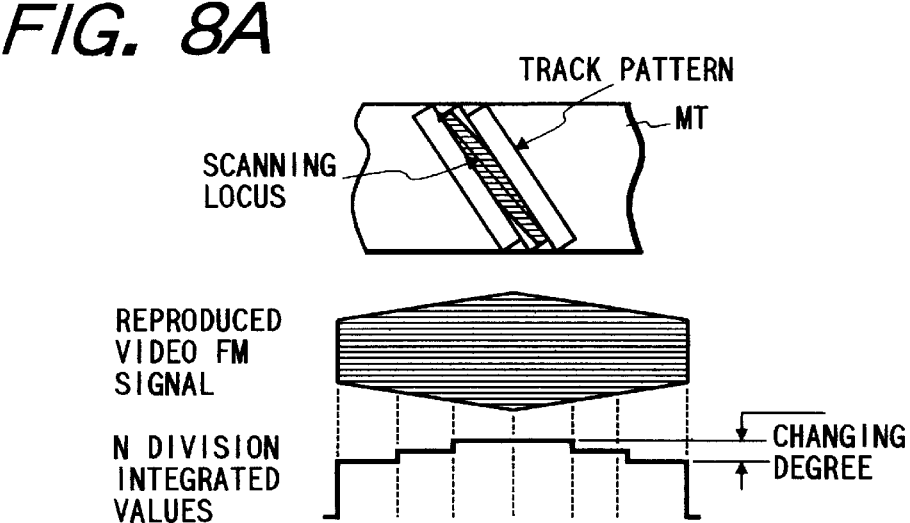
FIGS. 8A to 8C show the difference among three groups of division integrated values DATA(n) obtained for the same shape value SHAPE=2.
Figure 8B:
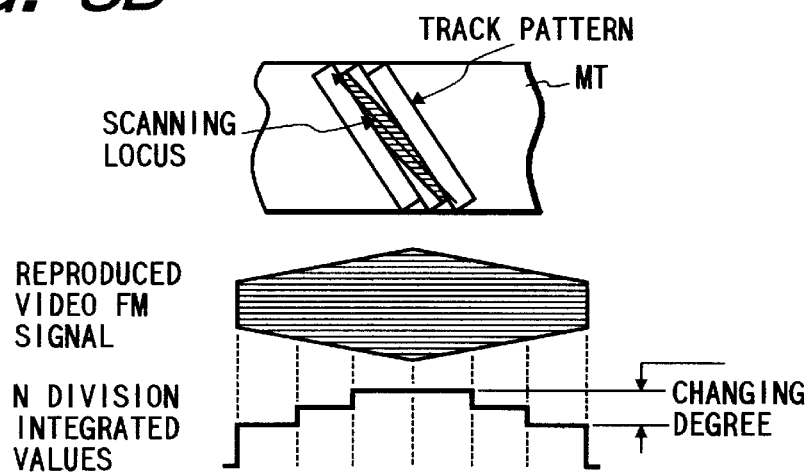
Figure 8C:
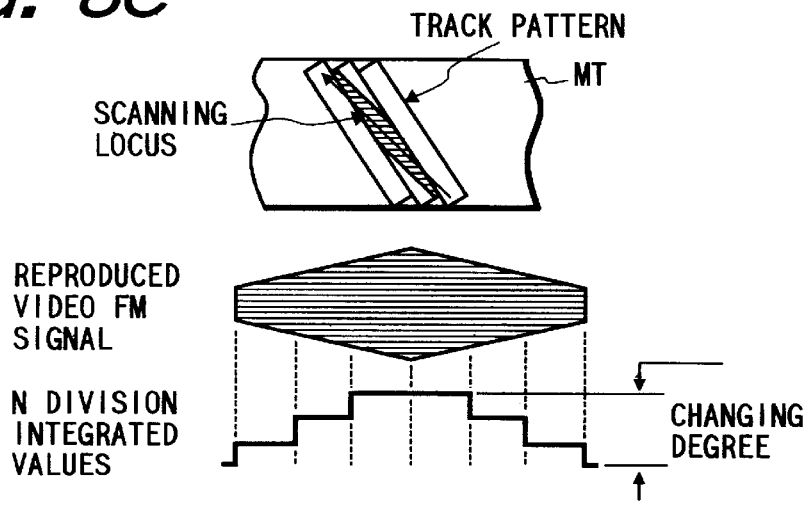

In the judgement for the changing degree of an FM envelope in one vertical scanning period performed in the step S9 shown in FIG. 4B, as shown in FIG. 7C, a maximum value and a minimum value are selected from among the division integrated values DATA(n), a difference between the maximum and minimum values is calculated as the changing value of the FM envelope, and it is judged whether or not the difference is minimized. Examples of differences for the same shape value SHAPE=2 are shown in FIGS. 8A to 8C. As shown in FIGS. 8A to 8C, even though the number of tracks crossed by one magnetic head in one vertical scanning period is the same, the difference is greatly changed according to an angle between a tracing direction of one magnetic head and a track direction.

Next, the macro-search and the micro-search performed in the steps 7 and 8 shown in FIG. 4B are described.

In the macro-search in the step S7, in cases where the shape value SHAPE equal to or higher than 3 is obtained five times in succession on condition that the inclination of the rotational drum 20 is changed in the same direction, an inclination angle of the rotational drum 20 repeatedly changed in the step S7 is reset to an original inclination angle set in the step S3. Thereafter, a motor reverse rotation control signal Scr is transmitted from the control microcomputer 10 to the motor driving amplifier 14, and the rotational drum 20 is inclined in the opposite direction. Thereafter, in cases where the shape value SHAPE does not become lower than 3 even though the inclination of the rotational drum 20 is changed in the opposite direction five times in succession, the step S12 is performed.

In case of the micro-search in the step S8, a first condition that the changing degree of the FM envelope is gradually decreased three times in succession on condition that the shape value SHAPE is within a range from 0 to 2 is defined. In cases where the changing degree of the FM envelope is increased after the first condition is satisfied, in cases where the changing degree of the FM envelope is increased five times in succession while ranging the shape value SHAPE from 0 to 2 without satisfying the first condition, or in cases where the shape value SHAPE is increased to a value equal to or higher than 3 after the first condition is satisfied, an inclination angle of the rotational drum 20 repeatedly changed in the step S8 is reset to an original inclination angle set in the step S3. Thereafter, a motor reverse rotation control signal is transmitted from the control microcomputer 10 to the motor driving amplifier 14. Thereafter, the steps S6 to S9 are repeated in the same manner to gradually incline the rotational drum 20 in the opposite direction. After the detection of the changing degree of the FM envelope for the inclination change of the rotational drum 20 in the both directions is finished, the step Sil is performed.

In the above detection, the number of successive times of the judgement for the shape value SHAPE is expressed by a positive integral number relating to a range of the changed inclination angle of the rotational drum 20. That is, in cases where the number of successive times is increased, the inclination angle of the rotational drum 20 is changed in a wider range. In an actual operation, the range of the changed inclination angle of the rotational drum 20 is determined by considering a changing degree of the inclination angle of the rotational drum 20 changed for each changing operation and the current inclination angle of the rotational drum 20 on condition that any excessive noise occurs in a reproduced image.

Therefore, the control microcomputer 10 of the system 11 functions as a flatness detecting means for detecting a flatness degree of a variable level of the reproduced video FM signal, in one vertical scanning period, read by each of the rotational heads 23a and 23b of which the scanning direction is changed by the motor 16 and the motor driving amplifier 14. Also, the control microcomputer 10 of the system 11 functions as an inclination angle control means for controlling the motor 16 and the motor driving amplifier 14 to maximize the flatness degree of the variable level of the reproduced signal.

Figure 9A:
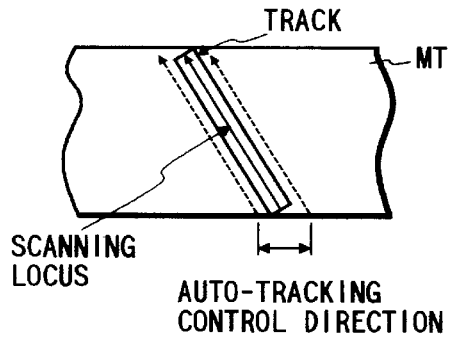
FIG. 9A shows a scanning direction of one magnetic head moved according to auto-tracking control in steps S4 and S12 shown in FIG. 4B.
Figure 9B:
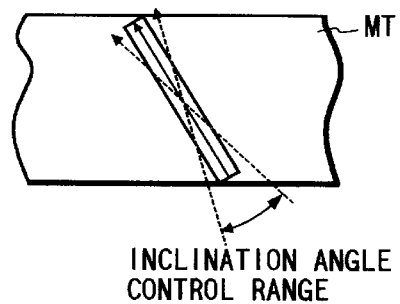
FIG. 9B shows a scanning direction of one magnetic head controlled in macro-search and micro-search which are performed in steps S7 and S8 shown in FIG. 4B.

FIG. 9A shows a scanning direction of one magnetic head moved according to the auto-tracking control performed in the steps S4 and S12, and FIG. 9B shows a scanning direction of one magnetic head controlled in the macro-search and the micro-search performed in the steps S7 and S8.

As shown in FIG. 9A, because one magnetic head is controlled in an auto-tracking control direction indicated by dotted lines, a head trace locus of one magnetic head in the reproducing operation agrees with a track formed on the magnetic tape MT. The head trace locus is indicated by a real line. Also, as shown in FIG. 9B, because the inclination angle of the rotational drum 20 is controlled in an inclination angle control range, a head trace locus of one magnetic head in the reproducing operation agrees with a track formed on the magnetic tape MT.

Next, an example that the inclination angle control method performed in the steps S1 to S12 is applied for a magnetic recording and reproducing apparatus is described with reference to FIG. 10.

Figure 10:
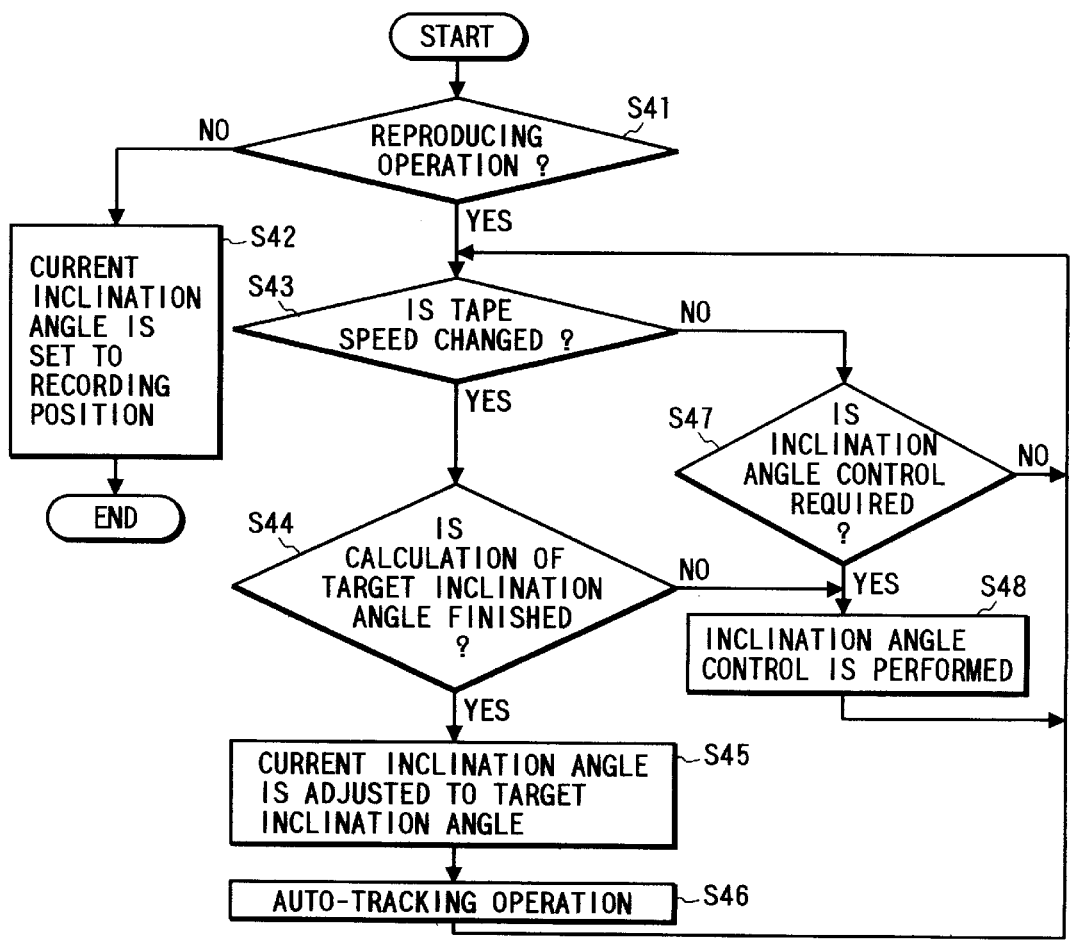
FIG. 10 is a flow chart showing a processing procedure performed in a CPU in which the control for a magnetic recording and reproducing apparatus is performed.

FIG. 10 is a flow chart showing a processing procedure performed in the CPU 10a in which the control for a magnetic recording and reproducing apparatus is performed.

As shown in FIG. 10, it is judged in a step S41 whether or not a magnetic recording and reproducing apparatus is set in a reproducing operation condition. In cases where the magnetic recording and reproducing apparatus is not set in the reproducing operation condition, a current inclination angle of the rotational drum 20 is set to a predetermined inclination angle (or a recording position) to set the rotational drum 20 in a recording condition (step 42). This setting of the rotational drum 20 is performed by inclining the rotational drum 20 according to an open loop control and stopping the operation of the motor 16 when one FG reset signal is received by the CPU 10a. In contrast, in cases where the magnetic recording and reproducing apparatus is set in the reproducing operation condition in the step S41, it is judged in a step S43 whether or not a tape speed in the reproducing operation is changed.

In cases where the tape speed in the reproducing operation is not changed, it is judged in a step S47 whether or not the control of the inclination angle of the rotational drum 20 is again required. For example, in cases where the shape of an FM envelope is considerably changed during the reproducing operation, in cases where the auto-tracking control set to an off condition is changed to an on condition, in cases where a video cassette tape is exchanged for another one, or in cases where an alternating current (AC) electric source set to an off condition is changed to an on condition, a retrial condition for the inclination angle control is satisfied, and the control of the inclination angle of the rotational drum 20 is again required. In this case, the control of the inclination angle of the rotational drum 20 is performed in a step S48. That is, the steps S1 to S12 shown in FIG. 4B are performed. Thereafter, the procedure returns to the step S43. In contrast, in cases where the control of the inclination angle of the rotational drum 20 is not again required in the step S47, the procedure returns to the step S43.

In contrast, it is judged in the step S43 that the tape speed in the reproducing operation is changed, it is judged in a step S44 whether or not an appropriate (target) inclination angle of the rotational drum 20 corresponding to a current tape speed has been already calculated. In other words, it is judged whether or not a target FG pulse counting value corresponding to the target inclination angle has been already calculated and stored. In cases where the target inclination angle of the rotational drum 20 has been already calculated, the target inclination angle (or the target FG pulse counting value) is read out from the RAM 10b in a step S45, and the current inclination angle of the rotational drum 20 is controlled to make the current inclination angle agree with the target inclination angle by operating the motor 16. In this case, a complicated procedure composed of the judgement of the envelope shape change (the step S5), the macro-search (the step S7) and the micro-search (the step S8) is not required. Thereafter, in a step S46, pieces of auto-tracking data are read out from the RAM 10b, and an auto-tracking control is performed according to the auto-tracking data. Thereafter, the procedure returns to the step S43. In contrast, it is judged in the step S44 that the target inclination angle of the rotational drum 20 has not been yet calculated, it is required to calculate the target inclination angle and control the inclination angle of the rotational drum 20. Therefore, the step S48 is performed.

Accordingly, the inclination angle of the rotational drum 20 is adjusted in the reproducing operation each time the tape speed in the reproducing operation is changed or set, and the inclination angle of the rotational drum 20 is merely set to the predetermined inclination angle in the recording operation.

Also, in cases where a target inclination angle (or a target FG pulse counting value) for a particular tape speed is not stored in the RAM 10b, the target inclination angle is calculated in the step S48 and is stored in the RAM 10b. Therefore, even though the apparatus is again operated at the particular tape speed in another reproducing operation, because the target inclination angle is stored in the RAM 10b, the inclination angle control can be easily performed in the step S45. In other words, the apparatus has a learning function.

The step S47 is performed for any tape speed in the reproducing operation. In cases where the retrial condition is satisfied, the control of the inclination angle of the rotational drum 20 is again required regardless of whether the tape speed in the reproducing operation is changed.

Next, the auto-tracking operation performed in the steps S4 and S12 is described with reference to FIG. 11.

FIG. 11 is a block diagram of an auto-tracking control system arranged in the magnetic recording and reproducing apparatus.

As shown in FIG. 11, in an auto-tracking control system 61, each of a plurality of reproduced video FM signals obtained from the magnetic heads 23a and 23b attached on the rotational drum 20 is transmitted to a level detecting circuit 64 through a video signal amplifier 62. Also, each of a plurality of reproduced audio signals obtained from the magnetic heads 23a and 23b is transmitted to the level detecting circuit 64 through an audio signal amplifier 63. Thereafter, levels of the reproduced video FM signals and/or levels of the reproduced audio signals are detected one after another in the level detecting circuit 64 and are transmitted to a system controller 65. In the system controller 65, an appropriate tracking position is calculated according to each of the levels, and a plurality of tracking addresses indicating the appropriate tracking positions are transmitted one after another to a servo circuit 66. In the servo circuit 66, a first actuating signal for actuating the rotational drum 20 is generated for each of the tracking addresses and is transmitted to the rotational drum 20. Also, a second actuating signal for actuating a capstan 67 is generated for each of the tracking addresses and is transmitted to the capstan 67. Therefore, a relative position between each of the rotational heads and the magnetic tape MT is adjusted.

Accordingly, because the auto-tracking operation is performed in the auto-tracking control system 61, a head locus of each of the rotational heads can agree with a track of a track pattern formed on the magnetic tape MT with a high accuracy in cooperation with the inclination angle control performed for the rotational drum 20.

In the first embodiment, the inclination angle control method is applied for a variable speed reproducing operation differing from a normal speed reproducing operation. However, in cases where the inclination angle control method according to the first embodiment is applied for the normal reproducing operation in which the magnetic tape MT is traveled at a standard speed, a trace locus of each magnetic head can agree with a track of a track pattern formed on the magnetic tape MT with a very high accuracy, and a reproduced image having a very high quality can be obtained.

Figure 12A:
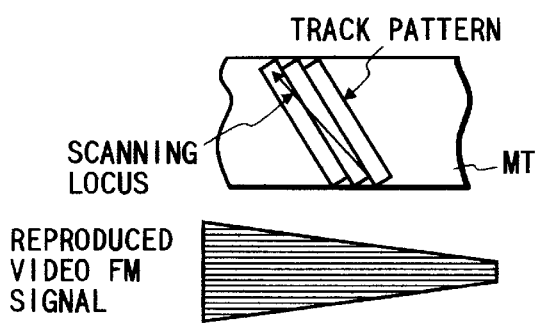
FIG. 12A shows a condition that a head locus direction of one rotational head is inclined with respect to an extending direction of a track formed on the magnetic tape.
Figure 12B:
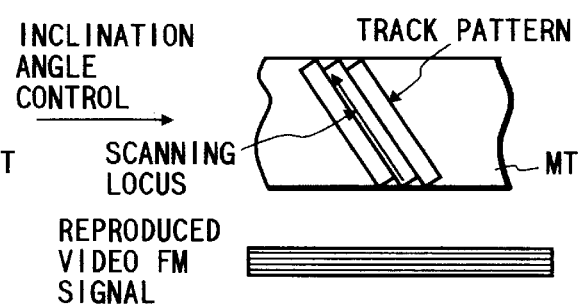
FIG. 12B shows a condition that the head locus of one rotational head is directed in parallel to the extending direction of the track and the head locus is shifted from a center of the track.
Figure 13:
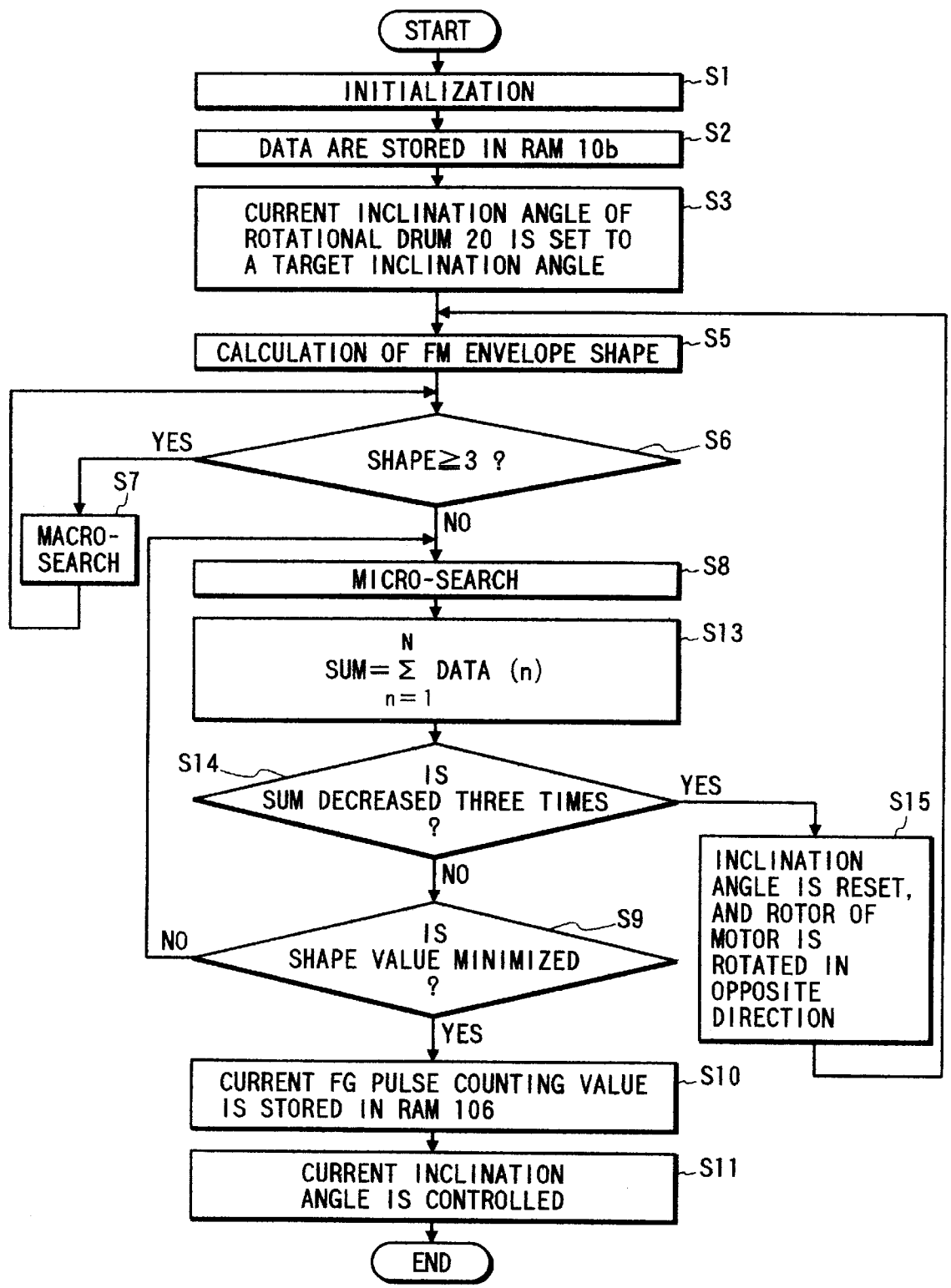
FIG. 13 is a flow chart showing an inclination angle control method appropriate for a still reproduction according to a second embodiment of the present invention.

Next, an inclination angle control method appropriate for a still reproduction is described according to a second embodiment of the present invention with reference to FIGS. 12 and 13.

In the still reproduction, a capstan motor for actuating the capstan 67 according to the second actuating signal is not operated. Therefore, an inclination angle of the rotational drum 20 is controlled without performing any auto-tracking operation. In this case, as shown in FIG. 12A, when a head locus direction of one rotational head is inclined with respect to an extending direction of a track formed on the magnetic tape MT (for example, the shape value SHAPE=1), the inclination angle of the rotational drum 20 is adjusted to direct the head locus of one rotational head in parallel to the extending direction of the track. As a result, as shown in FIG. 12B, even though the head locus of one rotational head is directed in parallel to the extending direction of the track, the head locus is often shifted from a center of the track. In other words, the head locus is undesirably shifted in a width direction of the track. In this case, even though the shape value SHAPE=0 is obtained and the level of the reproduced video FM signal is flattened, the level value of the reproduced video FM signal is considerably lowered.

To prevent the above drawback, an inclination angle controlling method shown in FIG. 13 is performed according to a second embodiment of the present invention.

FIG. 13 is a flow chart showing an inclination angle control method appropriate for a still reproduction according to a second embodiment of the present invention.

As shown in FIG. 13, after the steps S1 to S8 are performed, a sum of the division integrated values DATA(n) is calculated in a step S13, and it is judged in a step S14 whether or not the sum is decreased three times in succession. Because the procedure between the step S8 and the step S9 is repeated to minimize the changing degree of the FM envelope in one vertical scanning period, the sum is repeatedly calculated in the step S13.

In cases where it is judged in the step S14 that the sum is not decreased three times in succession, the step S9 is performed. In contrast, in cases where the sum is decreased three times in succession, it is judged that the micro-search and the macro-search performed in the steps S7 and S8 are not appropriate. Therefore, in a step S15, the inclination angle of the rotational drum 20 repeatedly changed in the steps S7 and S8 is reset to an original inclination angle set in the step S3, and a motor reverse rotation control signal Scr is transmitted from the control microcomputer 10 to the motor driving amplifier 14. Thereafter, the steps S5 to S8 are performed in the same manner to gradually incline the rotational drum 20 in the opposite direction.

Though the first embodiment is described with reference to FIG. 4B and the second embodiment is described with reference to FIG. 13, it is applicable that a step for judging whether or not a still mode is selected be added to unify the flow chart of the first embodiment and that of the second embodiment.

Next, a third embodiment of the present invention, in which the inclination angle of the rotational drum 20 is accurately and easily set to an appropriate inclination angle even though a recording tape speed characteristic for a particular magnetic recording and reproducing apparatus differs from that for another apparatus or the recording tape speed characteristic in one magnetic recording and reproducing apparatus changes, is described. In the third embodiment, in cases where the magnetic tape MT is traveled at an N-times reproducing tape speed which is N-times as high as a normal reproducing tape speed, N tracks recorded on the magnetic tape MT is scanned by each of the magnetic heads 23a and 23b in one vertical scanning period.

The drum structure DS shown in FIG. 2 is described in more detail.

Figure 14:
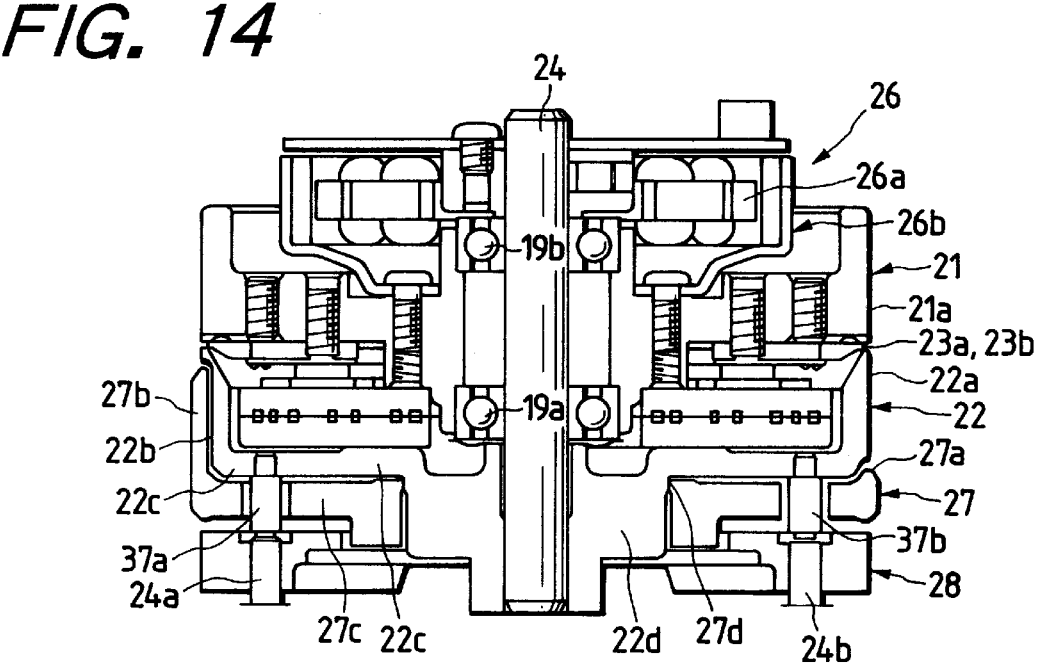
FIG. 14 is a longitudinal sectional view of the drum structure shown in FIG. 2, according to a third embodiment.
Figure 15:
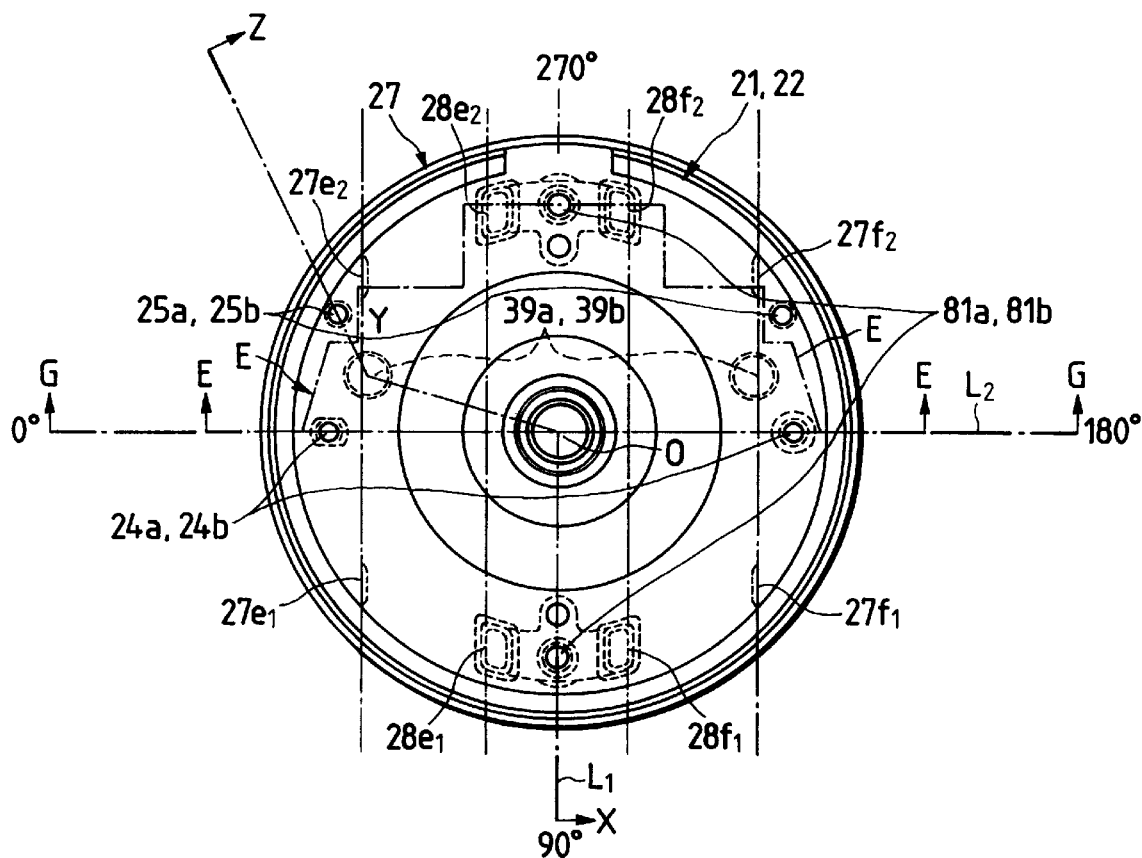
FIG. 15 is a top view of the drum structure shown in FIG. 2, according to the third embodiment.
Figure 16:
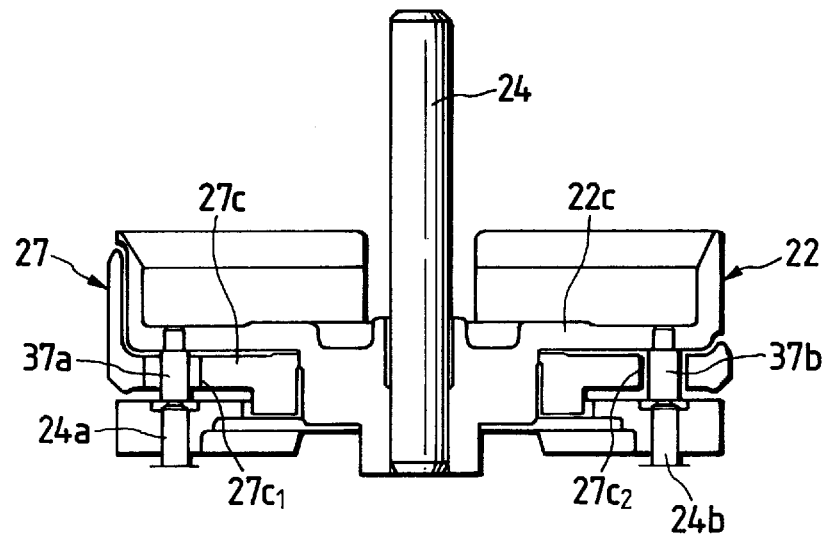
FIG. 16 is a sectional view taken generally along a line G—G of FIG. 15.
Figure 17:
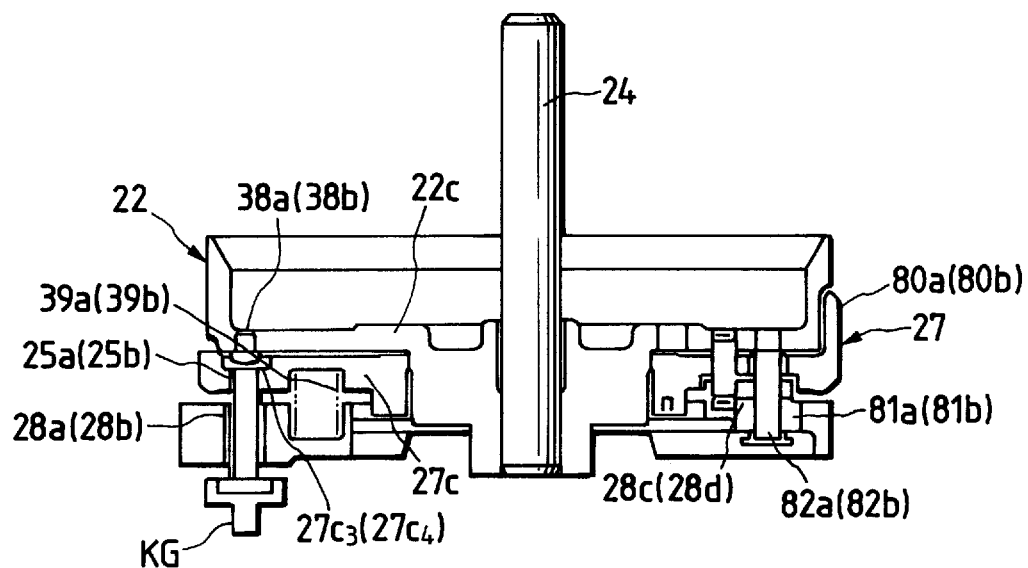
FIG. 17 is a sectional view taken generally along a line X-O-Y-Z of FIG. 15.
Figure 18:
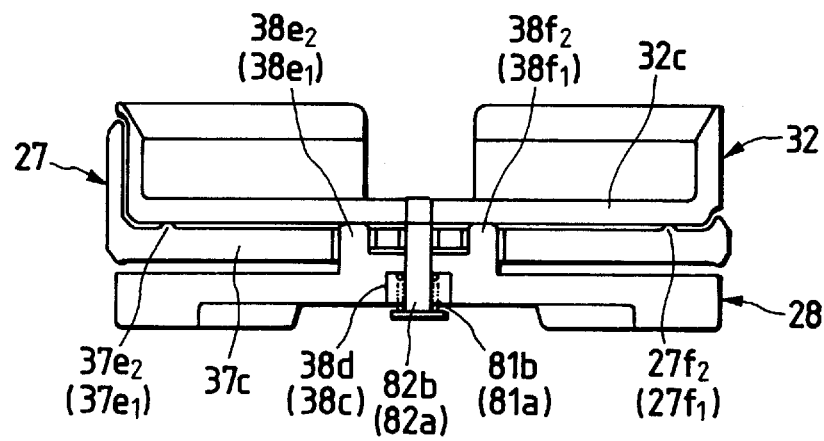
FIG. 18 is a sectional view taken generally along a line E—E of FIG. 15.
Figure 19:
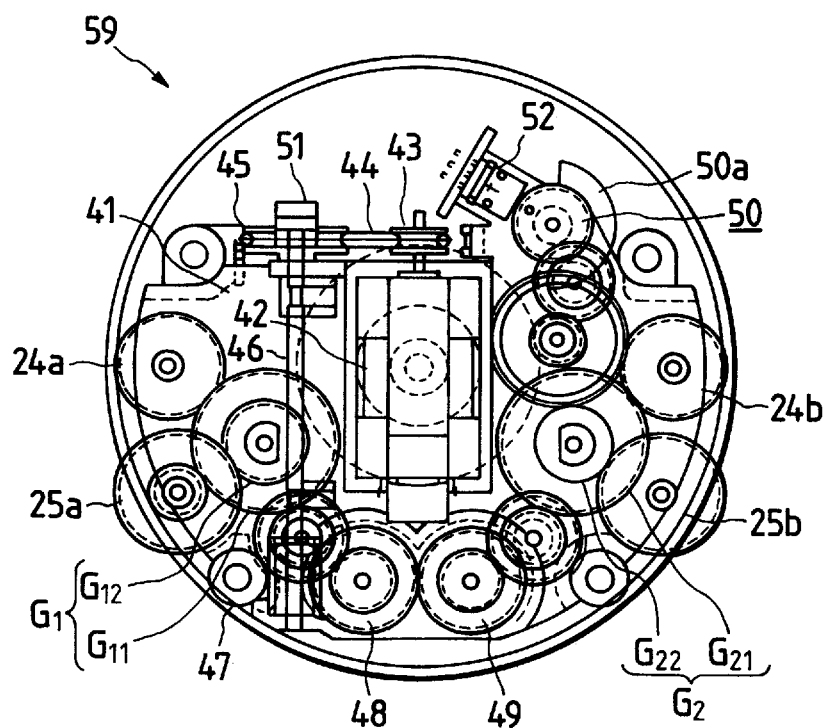
FIG. 19 is a bottom view of the drum structure shown in FIG. 2, according to the third embodiment.
Figure 20:
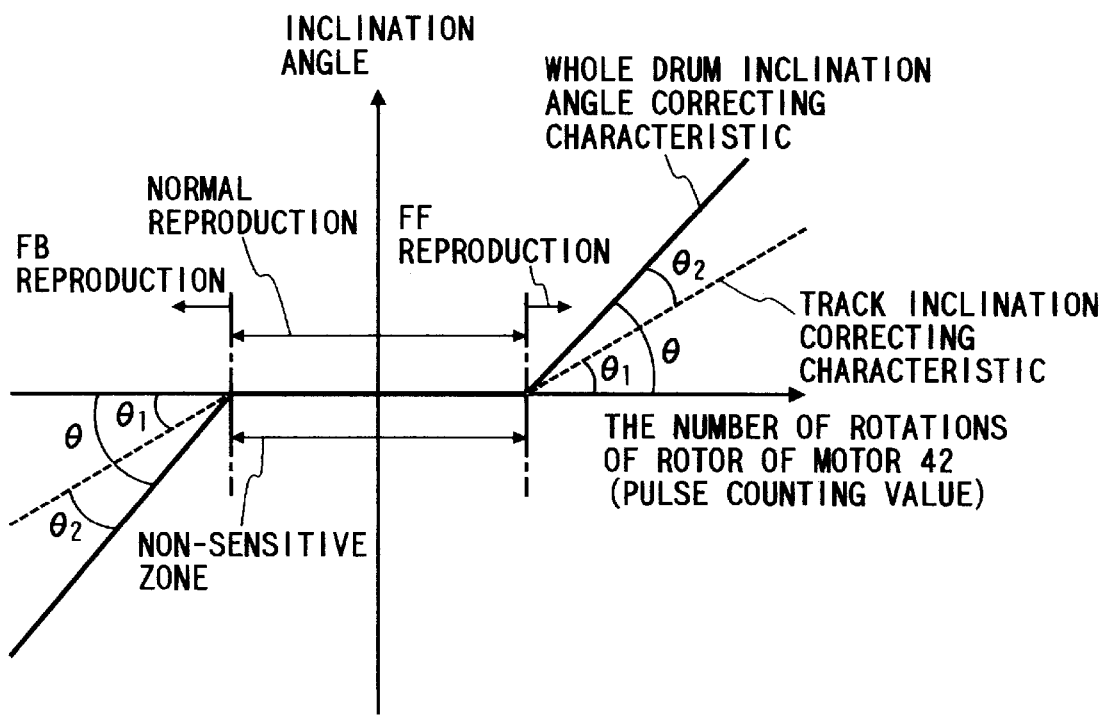
FIG. 20 shows a whole drum inclination angle correcting characteristic, a lead inclination angle correcting characteristic and a track inclination correcting characteristic according to the third embodiment.

FIG. 14 is a longitudinal sectional view of the drum structure DS shown in FIG. 2. FIG. 15 is a top view of the drum structure DS shown in FIG. 2. FIG. 16 is a sectional view taken generally along a line G—G of FIG. 15. FIG. 17 is a sectional view taken generally along a line X-O-Y-Z of FIG. 15. FIG. 18 is a sectional view taken generally along a line E—E of FIG. 15. FIG. 19 is a bottom view of the drum structure DS shown in FIG. 2. FIG. 20 shows a whole drum inclination angle correcting characteristic, a lead inclination angle correcting characteristic and a track inclination correcting angle.

As shown in FIGS. 2 and 14, the drum axis 24 is inserted into a center portion of the lower drum 22 under pressure, and the upper drum 21 is coaxially supported by the drum axis 24 through a pair of bearings 19a and 19b put on the drum axis 24. The tape sliding surface 21a for leading a bound magnetic tape MT is formed at the periphery of the upper drum 21 at the same diameter with that of the upper drum 21, and the tape sliding surface 22a for leading the bound magnetic tape MT is formed at the periphery of the lower drum 22 at the same diameter with that of the lower drum 22. In the lower drum 22, the small diameter portion 22b having a diameter smaller than that of the tape sliding surface 22a is helically arranged on a lower side of the tape sliding surface 22a, and a lower small diameter portion 22d having a diameter smaller than that of the small diameter portion 22b, is arranged on a lower portion of a center of a bottom surface portion 22c of the lower drum 22 and extends toward the drum portion 28.

The upper drum 21 on which the magnetic heads 23a and 23b are attached is rotated around the drum axis 24 by an actuating power provided by a drum motor 26. In this case, the drum motor 16 is composed of a stator 26a fixed on an upper end side of the drum axis 24 and a rotor 26b rotated with the upper drum 21. Also, signals transmitted from the magnetic heads 23a and 23b are received by a rotational transformer 36a attached to the upper drum 21 and a rotational transformer 36b attached to the lower drum 22, and signals transmitted from the rotational transformers 36a and 36b are received by the magnetic heads 23a and 23b.

On a lower side of the periphery of the lower drum 22, the leading ring 27 formed of the helical lead 27a is separately provided. The leading ring 27 is movably placed close to an outer periphery of the small diameter portion 22b which is formed in a helical shape at a lower portion of the lower drum 22. The leading ring 27 is composed of an annular portion 27b having the helical lead 27a at its upper end and a bottom surface portion 27c. Also, a penetrating hole is formed at a center portion of the bottom portion 27c of the leading ring 27, and a knife edge portion 27d is formed at an inner circular portion of the penetrating hole. The knife edge portion 27d is inserted into the lower small diameter portion 22d.

As shown in FIGS. 15 and 16, a pair of location pins 37a and 37b having a superior wear and abrasion resistance are fixedly attached to an outer periphery of the bottom surface portion 22c of the lower drum 22 on a 0(degree)–180 (degree) L2 line symmetrical to each other with respect to a 90 (degree)–270(degree) L1 line, and a pair of lower ends of the location pins 37a and 37b are projected into an elliptic hole 27c1 and a circular hole 27c2 arranged in the bottom surface portion 27c of the leading ring 27. In this case, the location pin 37a placed on a 0 degree side is movably inserted into the elliptic hole 27c1 in a 0(degree)–180 (degree) direction, and the location pin 37a is fixedly placed in another direction perpendicular to the 0(degree)–180 (degree) direction. Also, the location pin 37b placed on a 100 degree side is movably inserted into the circular hole 27c2.

Also, top ends of the screws 24a and 24b screwed into the drum base 28 are detachably touched to the lower ends of the location pins 37a and 37b, and the lower drum 22 is pressed by the screws 24a and 24b screwed into the drum base 28. Therefore, the screws 24a and 24b have a function for correcting an inclination of the whole rotational drum 20. That is, in an FF reproducing mode operation, the location pin 37a placed on the 0 degree side is pressed up by a tip of the screw 24a, a 0 degree side bottom surface portion 22c of the lower drum 22 is pressed up, the upper and lower drums 21 and 22 supported by the drum axis 24 are rotationally moved with the leading ring 27 by a whole drum inclination correcting angle θ in a clockwise direction with respect to the drum base 28, and the inclination of the rotational drum 20 in the FF reproducing mode operation is corrected. In contrast, in an FB reproducing mode operation, the location pin 37b on the 180 degree side is pressed up by a tip of the screw 24b, a 180 degree side bottom surface portion 22c of the lower drum 22 is pressed up, the upper and lower drums 21 and 22 supported by the drum axis 24 are rotationally moved with the leading ring 27 by a whole drum inclination correcting angle θ in a counterclockwise direction with respect to the drum base 28, and the inclination of the rotational drum 20 in the FB reproducing mode operation is corrected.

In this case, even though the lower drum 22 is rotationally moved by the screws 24a and 24b screwed into the drum base 28 in the FF reproducing mode operation and the FB reproducing mode operation, the screws 24a and 24b are not inclined. Therefore, gear portions of the screws 24a and 24b are directly engaged with the two speed gears $G_1$ and $G_2$ of the actuating means 40.

As shown in FIGS. 15 and 17, the location pin 37a (or 37b) having a superior wear and abrasion resistance is fixedly attached to an outer periphery of the bottom surface portion 22c of the lower drum 22 on the 0(degree)–180 (degree) L2 line symmetrical to each other with respect to the 90 (degree)–270(degree) L1 line, and lower ends of the location pin 37a (or 37b) is projected into a relief hole 27c3 (or 27c4) arranged in the bottom surface portion 27c of the leading ring 27. In addition, a top end of the screw 25a (or 25b) screwed into the bottom surface portion 27c of the leading ring 27 is penetrating through a relief hole 28a (or 28b) of the drum base 28 and is detachably touched to a lower end of a pin 38a (or 38b).

In this case, the screws 25a and 25b screwed into the leading ring 27 press the lower drum 22, and the screw 25a is placed on the 0 degree side, and the screws 25a and 25b have a function for correcting an inclination of a track formed on the magnetic tape MT. That is, in the FF reproducing mode operation, when the pin 38a placed on the 0 degree side is pressed up by a tip of the screw 25a placed on the 0 degree side, though the 0 degree side bottom surface portion 27c of the leading ring 27 is pressed down by a track inclination correcting angle θ1 (shown in FIG. 20) with respect to the lower drum 22, the 0 degree side bottom surface portion 27c of the leading ring 27 is rotationally moved in the clockwise direction with respect to the drum base 28, and the inclination of the track in the FF reproducing mode operation is corrected. In contrast, in the FB reproducing mode operation, the pin 38b placed on the 180 degree side is pressed up by a tip of the screw 25b placed on the 180 degree side, the 180 degree side bottom surface portion 27c of the leading ring 27 is pressed down by a track inclination correcting angle θ1 with respect to the lower drum 22, the 0 degree side bottom surface portion 27c of the leading ring 27 is rotationally moved in the counterclockwise direction with respect to the drum base 28, and the inclination of the track in the FB reproducing mode operation is corrected.

Therefore, in the FF reproducing mode operation, a leading correction inclination angle θ2 is obtained by subtracting the track inclination correcting angle θ1 caused by the screws 25a and 25b screwed into the leading ring 27 from the whole drum inclination correcting angle θ caused by the screws 25a and 25b screwed into the drum base 28, and a leading correction is performed by the leading correction inclination angle θ2 in the FF reproducing mode operation in which the leading ring 27 is rotationally moved in the clockwise direction with respect to the drum base 28. In the same manner, another leading correction is performed by the leading correction inclination angle θ2 in the FB reproducing mode operation in which the leading ring 27 is rotationally moved in the counterclockwise direction with respect to the drum base 28.

The object of the leading correction is described. Because of the rotation of the drum structure DS caused by the track correction, the magnetic tape MT is pulled in a direction of the rotation. As a result, the reference edge Te of the magnetic tape MT intends to depart from the helical lead 27a of the leading ring 27 on an inlet side of the magnetic tape MT with respect to the drum structure DS, and the reference edge Te of the magnetic tape MT intends to push to the helical lead 27a on an outlet side of the magnetic tape MT with respect to the drum structure DS. Therefore, the leading ring 27 is rotationally moved to make the helical lead 27a match with the reference edge Te of the magnetic tape MT. In brief, to compensate the displacement of the reference edge Te of the magnetic tape MT caused by the track correction, the leading ring 27 is rotationally moved in the leading correction to make the helical lead 27a match with the reference edge Te of the magnetic tape MT.

Therefore, the combination of the screws 24a and 24b functions as a whole drum correction actuating means for rotationally moving the upper and lower drums 21 and 22 supported by the drum axis 24 with the leading ring 27 with respect to the drum base 28 in the FF reproducing mode operation and the FB reproducing mode operation. Also, the combination of the screws 25a and 25b functions as a track inclination correction actuating means for successively inclining the drum axis 24 with respect to an imaginary central axis of the leading ring 27 according to a traveling speed of the magnetic tape MT to make a track pattern formed on the magnetic tape MT agree with rotational loci of the magnetic heads 23a and 23b formed on the magnetic tape MT in the FF reproducing mode operation and the FB reproducing mode operation. Also, the cooperative configuration of the combination of the screws 24a and 24b and the combination of the screws 25a and 25b functions as a lead correction actuating means for successively inclining the imaginary central axis of the leading ring 27 to make the helical lead 27a agree with a reference edge of the magnetic tape MT.

In this case, because the screws 25a and 25b are inclined with respect to the drum base 28 in the FF reproducing mode operation and the FB reproducing mode operation when the leading ring 27 is rotationally moved by the screws 25a and 25b screwed into the leading ring 27, gear portions arranged in lower ends of the screws 24a and 24b are movably inserted into ends of coupling gears KG to connect the screws 24a and 24b to the coupling gears KG, and gear portions arranged at lower ends of the coupling gears KG are engaged with the two speed gears $G_1$ and $G_2$ arranged in a series of gears of an actuating means 59 (FIG. 19).

Also, in the neighborhood of the screws 25a and 25b screwed into the bottom surface portion 27c of the leading ring 27, a pair of compression springs 39a and 39b are arranged at a narrow region between a reverse surface of the bottom surface portion 27c of the leading ring 27 and the drum base 28, and the leading ring 27 is pressed by a weal force of the compression springs 39a and 39b toward the lower drum 22

Also, a pair of location pins 80a and 80b are arranged among an outer peripheral portion of the bottom surface portion 22c of the lower drum 22, an outer peripheral portion of the bottom surface portion 27c of the leading ring 27 and the drum base 28 and are placed on the 90(degree)–270 (degree) L1 line symmetrical to each other with respect to the 0(degree)–180(degree) L2 line. The location pins 80a and 80b position the lower drum 22 and the drum base 28.

Also, as shown in FIGS. 15, 17 and 18, a pair of stepped holes 28c and 28d are opened on a rear surface side of the drum base 28 and are placed on the 90(degree)–270(degree) L1 line symmetrical to each other with respect to the 0 (degree)–180(degree) L2 line. A flanged screw 82a (or 82b) inserted into a compression spring 81a (or 81b) is inserted into the stepped hole 28c (or 28d) from a lower side, and a top of the flanged screw 82a (or 82b) is screwed into the lower drum 22 through a penetrating hole of the leading ring 27.

In this case, a spring force of the compression spring 81a (or 81b) is stronger than that of the compression spring 39a (or 39b), and the lower drum 22 is pushed toward the drum base 28 by a strong force of the compression spring 81a (or 81b) narrow-placed between the flange of the flanged screw 82a (or 82b) and the stepped hole 28c (or 28d).

Next, a rotational movement supporting point of the lower drum 22 for rotating the upper and lower drums 21 and 22 and the leading ring 27 in a clockwise or counterclockwise direction with respect to the drum base 28 is described with reference to FIGS. 15 and 18.

As shown in FIGS. 15 and 18, a pair of first rotational movement supporting points 28e1 and 28e2 are placed in the neighborhood of an outer periphery of an upper surface of the drum base 28 symmetrical to each other with respect to the 0(degree)–180(degree) L2 line, and a pair of second rotational movement supporting points 28f1 and 28f2 are placed in the neighborhood of the outer periphery of the upper surface of the drum base 28 symmetrical to each other with respect to the 0(degree)–180(degree) L2 line. A group of the first rotational movement supporting points 28e1 and 28e2 is symmetrical to a group of the second rotational movement supporting points 28f1 and 28f2 with respect to the 90(degree)–270(degree) L1 line, and the first and second rotational movement supporting points 28e1, 28e2, 28f1 and 28f2 are projected toward the lower drum 22 while maintaining the height accuracy. In other words, the first rotational movement supporting points 28e1 and 28e2 are placed on the left side (or the 0 degree side) with respect to the drum axis 24, and the second rotational movement supporting points 28f1 and 28f2 are placed on the right side (or the 180 degree side).

In this embodiment, the first rotational movement supporting points 28e1 and 28e2 (or the second rotational movement supporting points 28f1 and 28f2) are placed on the drum base 28 in parallel to the 90(degree)–270(degree) L1 line. However, it is applicable that the first rotational movement supporting points 28e1 and 28e2 (or the second rotational movement supporting points 28f1 and 28f2) be placed on a line almost parallel to the 90(degree)–270 (degree) L1 line.

In addition, the first rotational movement supporting points 28e1 and 28e2 and the second rotational movement supporting points 28f1 and 28f2 placed on the drum base 28 penetrate though a plurality of relief holes 27c5 to 27c8 opened in the bottom surface portion 27c of the leading ring 27 and are detachably touched to a reverse surface of the bottom surface portion 22c of the lower drum 22. As described in detail later, in a normal reproducing mode, the first rotational movement supporting points 28e1 and 28e2 and the second rotational movement supporting points 28f1 and 28f2 are touched to the bottom surface portion 22c of the lower drum 22. In the FF reproducing mode, the second rotational movement supporting points 28f1 and 28f2 are touched to the 180 degree side bottom surface portion 22c of the lower drum 22. In the FB reproducing mode, the first rotational movement supporting points 28e1 and 28e2 are touched to the 0 degree side bottom surface portion 22c of the lower drum 22.

Also, a pair of first rotational movement supporting points 27e1 and 27e2 are placed in the neighborhood of an outer periphery of an upper surface of the bottom surface portion 27c placed in the inner circular portion of the leading ring 27 symmetrical to each other with respect to the 0(degree)–180 (degree) L2 line, and a pair of second rotational movement supporting points 27f1 and 27f2 are placed in the neighborhood of the outer periphery of the upper surface of the bottom surface portion 27c placed in the inner circular portion of the leading ring 27 symmetrical to each other with respect to the 0(degree)–180(degree) L2 line. A group of the first rotational movement supporting points 27e1 and 27e2 is symmetrical to a group of the second rotational movement supporting points 27f1 and 27f2 with respect to the 90(degree)–270(degree) L1 line, and the first and second rotational movement supporting points 27e1, 27e2, 27f1 and 27f2 are projected toward the lower drum 22 while maintaining the height accuracy. In other words, the first rotational movement supporting points 27e1 and 27e2 on the leading ring 27 are placed on the left side (or the 0 degree side) with respect to the drum axis 24, and the second rotational movement supporting points 27f1 and 27f2 on the leading ring 27 are placed on the right side (or the 180 degree side). Also, the first rotational movement supporting points 27e1 and 27e2 (or the second rotational movement supporting points 27f1 and 27f2) are placed outside the first rotational movement supporting points 28e1 and 28e2 (or the second rotational movement supporting points 28f1 and 28f2) placed on the drum base 28.

In this embodiment, the first rotational movement supporting points 27e1 and 27e2 (or the second rotational movement supporting points 27f1 and 27f2) are placed on the leading ring 27 in parallel to the 90(degree)–270(degree) L1 line. However, it is applicable that the first rotational movement supporting points 27e1 and 27e2 (or the second rotational movement supporting points 27f1 and 27f2) be placed on a line almost parallel to the 90(degree)–270 (degree) L1 line.

In addition, the first rotational movement supporting points 27e1 and 27e2 and the second rotational movement supporting points 27f1 and 27f2 placed on the leading ring 27 are detachably touched to the reverse surface of the bottom surface portion 22c of the lower drum 22. As described in detail later, in the normal reproducing mode, the first rotational movement supporting points 27e1 and 27e2 and the second rotational movement supporting points 27f1 and 27f2 are touched to the bottom surface portion 22c of the lower drum 22. In the FF reproducing mode, the second rotational movement supporting points 27f1 and 27f2 are touched to the 180 degree side bottom surface portion 22c of the lower drum 22. In the FB reproducing mode, the first rotational movement supporting points 27e1 and 27e2 are touched to the 0 degree side bottom surface portion 22c of the lower drum 22.

In this case, it is not required to produce the reverse surface of the leading ring 27 with a high size precision, and it is required to produce the inner circular portion of the upper surface of the leading ring 27 with a high size precision.

In this embodiment, the first rotational movement supporting points 27e1 and 27e2 and the second rotational movement supporting points 27f1 and 27f2 are placed on the inner circular portion of the upper surface of the leading ring 27. However, it is applicable that the first rotational movement supporting points 27e1 and 27e2 and the second rotational movement supporting points 27f1 and 27f2 be placed on the reverse surface of the bottom surface portion 22c of the lower drum 22. In other words, it is applicable that the first rotational movement supporting points 27e1 and 27e2 and the second rotational movement supporting points 27f1 and 27f2 be placed between the leading ring 27 and the lower drum 22 through the drum axis 24.

Next, an actuating means 59 in which the screws 24a and 24b rotationally moving the lower drum 22 and the screws 25a and 25b rotationally moving the leading ring 27 are rotationally and simultaneously actuated by a rotational drum actuating motor 42 is described in brief with reference to FIG. 19.

As shown in FIG. 19, constitutional elements of the actuating means 59 except for the motor 42 are operated in the same manner as those of the actuating means 40 shown in FIG. 3. Therefore, because the screws 24a and 24b are engaged with the larger diameter gear portions $G_{11}$ and $G_{21}$ of the two speed gears $G_1$ and $G_2$, the screws 24a and 24b for correcting the inclination of the whole rotational drum 20 are rotated by the motor 42 at a high degree according to a whole drum inclination angle correcting characteristic (FIG. 20) to rotate the upper and lower drums 21 and 22 by the whole drum inclination correcting angle θ. In contrast, because the screws 25a and 25b are engaged with the smaller diameter gear portions $G_{12}$ and $G_{22}$ of the two speed gears $G_1$ and $G_2$, the screws 25a and 25b for correcting the inclination of the track formed on the magnetic tape MT are rotated by the motor 42 at a low degree according to a lead inclination angle correcting characteristic (FIG. 20) to rotate the bottom portion of the leading ring 27 by a lead inclination correcting angle θ2 obtained by subtracting the track inclination correcting angle θ1 from the whole drum inclination correcting angle θ.

Also, as shown in FIG. 20, the whole drum inclination angle correcting characteristic and the lead inclination angle correcting characteristic have a non-sensitive zone in which the correcting angle θ (or θ1) is not changed even though the screws 24a and 24b (or 25a and 25b) are rotated by the motor 42. The non-sensitive zone corresponds to the normal reproducing mode operation in which the screws 24a and 24b screwed into the drum base 28 are detached from the lower drum 22, the screws 25a and 25b screwed into the leading ring 27 are detached from the lower drum 22 and the first rotational movement supporting points 28e1 and 28e2 and the second rotational movement supporting points 28f1 and 28f2 placed on the drum base 28 and the first rotational movement supporting points 27e1 and 27e2 and the second rotational movement supporting points 27f1 and 27f2 placed on the leading ring 27 are touched to the reverse surface of the bottom surface portion 22c of the lower drum 22.

Also, because the fan-shaped shielding plates (not shown) are attached to the second pulley 45, the number of pulses (or the current pulse counting value) indicating the number of rotations of a rotor of the motor 42 is detected by a pulse counter through the photo-electro sensor 51, so that it is detected whether or not the inclination angle of the rotational drum 20 reaches a target inclination angle. Also, when the rotational drum 20 is inclined at an inclination angle corresponding to a standard speed recording operation, an edge of the fan-shaped shielding plate 50a attached to the reset gear 50 is detected by the photo-electro sensor 52, and the number of pulses detected by the pulse counter is reset by a detecting signal of the photo-electro sensor 52.

Next, the movement of the drum structure DS according to the third embodiment is described with reference to FIGS. 20, and 21A to 21C.

Figure 21A:
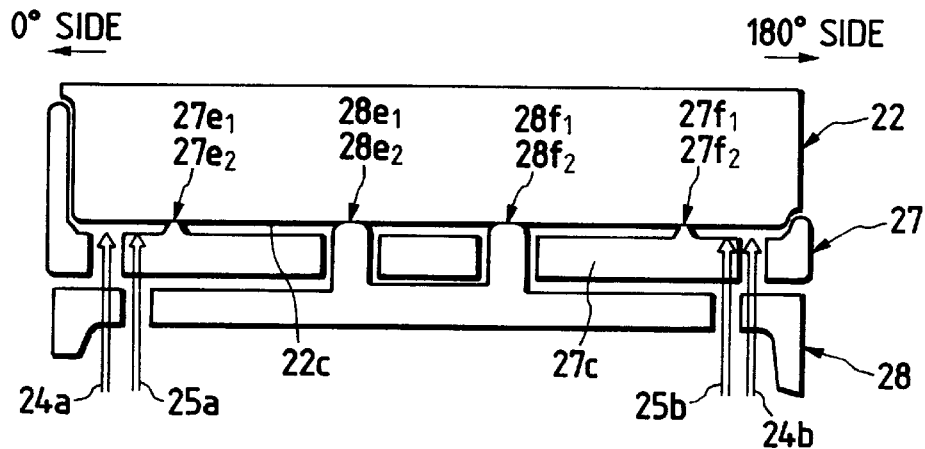
FIG. 21A shows the movement of a rotational drum, composed of a leading ring and upper and lower drums supported by a drum axis, in a normal reproducing mode operation according to the third embodiment.
Figure 21B:
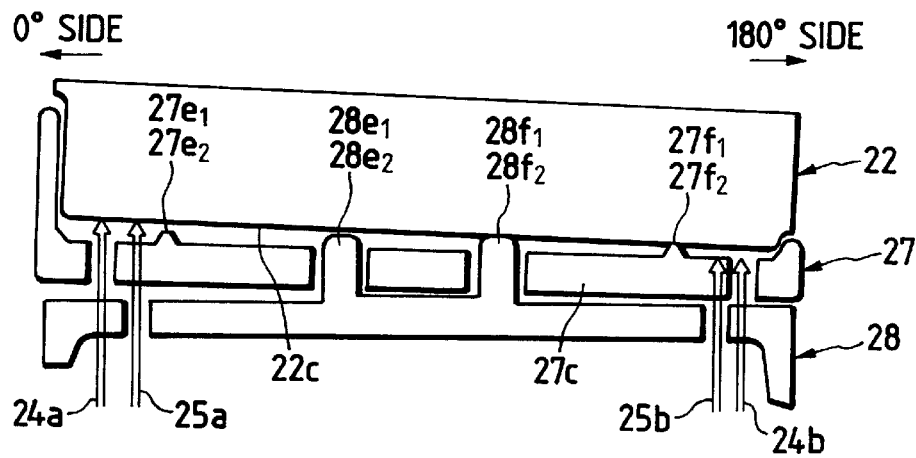
FIG. 21B shows the movement of the rotational drum in a FF reproducing mode operation according to the third embodiment.
Figure 21C:
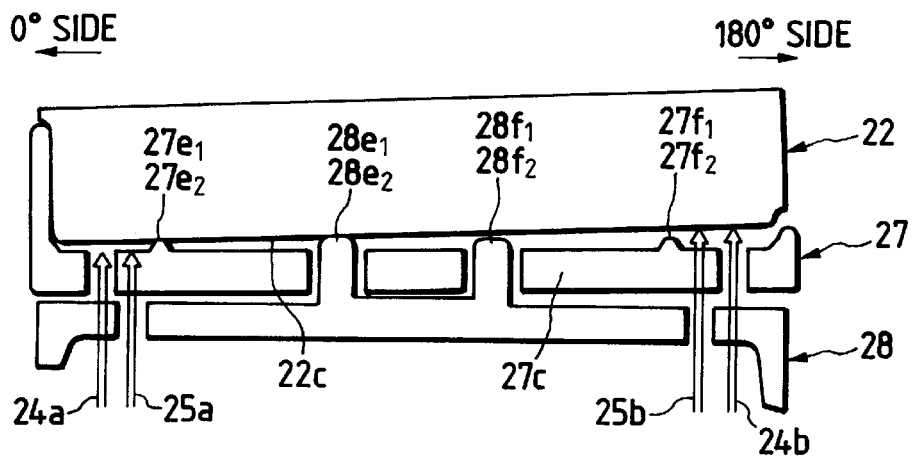
FIG. 21C shows the movement of the rotational drum in a FB reproducing mode operation according to the third embodiment.

FIG. 21A shows the movement of the rotational drum, composed of the leading ring 27 and the upper and lower drums 21 and 22 supported by the drum axis 24, in the normal reproducing mode operation, FIG. 21B shows the movement of the rotational drum in the FF reproducing mode operation, and FIG. 21C shows the movement of the rotational drum in the FB reproducing mode operation.

In FIGS. 21A to 21C, the 0 degree side indicates a magnetic tape inlet side (the left side with respect to the drum axis 24) in the normal reproducing mode operation, and the 180 degree side indicates a magnetic tape outlet side (the right side with respect to the drum axis 24) in the normal reproducing mode operation.

As shown in FIG. 21A, in cases where the reproducing operation is performed for the magnetic tape MT traveled at a standard speed, the leading ring 27 and the upper and lower drums 21 and 22 supported by the drum axis 24 are not inclined with respect to the drum base 28 but are in parallel to the drum base 28. That is, the first rotational movement supporting points 28e1 and 28e2 and the second rotational movement supporting points 28f1 and 28f2 placed on the drum base 28 and the first rotational movement supporting points 27e1 and 27e2 and the second rotational movement supporting points 27f1 and 27f2 placed on the leading ring 27 are touched to the reverse surface of the bottom surface portion 22c of the lower drum 22. In this case, the screws 24a and 24b screwed into the drum base 28 are relieved in the lower direction without touching the location pins 37a and 37b (FIG. 16) fixedly attached to the bottom surface portion 22c of the lower drum 22, and the screws 25a and 25b screwed into the leading ring 27 are relieved in the lower direction without touching the location pins 38a and 38b (FIG. 17) fixedly attached to the bottom surface portion 22c of the lower drum 22.

Also, the lower drum 22 is pushed toward the drum base 28 by a strong force of the compression springs 81a and 81b narrow-placed between the lower drum 22 and the drum base 28, and the leading ring 27 is pushed toward the lower drum 22 by a weak force of the compression springs 39a and 39b narrow-placed between the leading ring 27 and the drum base 28. Therefore, the lower drum 22 is reliably supported on the supporting points 27e1, 27e2, 27f1, 27f2, 28e1, 28e2, 28f1 and 28f2 while maintaining the height size, and the leading ring 27 is also reliably supported while maintaining the height size.

Accordingly, an imaginary central axis of the leading ring 27 agrees with the drum axis 24 with a high precision, and a condition that these axes are perpendicular to the drum base 28 is obtained. In this condition, when the magnetic tape MT on which data are recorded at the standard mode is traveled at a prescribed speed (for example, 33.35 mm/sec in case of the VHS type VTR) corresponding to the normal reproducing mode operation while the reference edge Te of the magnetic tape MT is lead by the helical lead 27a of the leading ring 27, rotational loci of the magnetic heads 23a and 23b agree with a track pattern recorded on the magnetic tape MT. This condition corresponds to the non-sensitive zone (FIG. 20) in which the inclination angles of the lower drum 22 and the leading ring 27 are not changed, and a reproduced signal indicating an envelope set in a superior condition.

Also, in cases where data are recorded on the magnetic tape MT traveled at the standard speed, the adjustment of the inclination angles of the drum axis 24 and the imaginary central axis of the leading ring 27 is performed in the same manner as in the reproducing operation.

As shown in FIG. 21B, in cases where the recording or reproducing operation is performed for the magnetic tape MT traveled at a fast feeding speed differing from the standard speed in a plus direction (for example, in cases where the normal reproducing mode is changed to the FF reproducing mode), the motor 42 (FIG. 19) is operated to push out the screws 24a and 25a placed on the 0 degree side in the upper direction according to the fast feeding speed. In this case, the screws 24b and 25b placed on the 180 degree side are pushed out in a relief direction apart from the lower drum 22 because the rotation of the screws 24b and 25b is opposite to that of the screws 24a and 25a. That is, when the screw 24a screwed into the drum base 28 is pushed out in the upper direction, the location pin 37a (FIG. 16) fixedly attached to the 0 degree side bottom surface portion 22c of the lower drum 22 is pushed up by a top of the screw 24a. Therefore, the 180 degree side bottom surface portion 22c of the lower drum 22 is touched to the second rotational movement supporting points 28f1 and 28f2 placed on the 180 degree side of the drum base 28, and the first rotational movement supporting points 28e1 and 28e2 placed on the 0 degree side of the drum base 28 become apart from the 0 degree side bottom surface portion 22c of the lower drum 22. As a result, the leading ring 27 and the upper and lower drums 21 and 22 supported by the drum axis 24 are rotationally moved in the clockwise direction around the second rotational movement supporting points 28f1 and 28f2 while resisting the spring power of the compression springs 81a and 81b (FIGS. 16 and 18).

Therefore, the leading ring 27 and the upper and lower rums 21 and 22 supported by the drum axis 24 are rotationally moved in the clockwise direction by the whole drum inclination correcting angle θ (FIG. 20) with respect to the drum base 28, and the rotational drum 20 is inclined in the FF reproducing mode according to the whole drum inclination angle correcting characteristic (FIG. 20) and the tape traveling speed. Also, because the screw 25a screwed into the leading ring 27 on the 0 degree side is pushed out while pushing out the screw 24a, when a top of the screw 25a is touched to the pin 38a (FIG. 17) fixedly attached to the 0 degree side bottom surface portion 22c of the lower drum 22, the 180 degree side bottom surface portion 22c of the lower drum 22 is touched to the second rotational movement supporting points 27f1 and 27f2 placed on the 180 degree side of the leading ring 27 by a reaction force generated by the contact of the screw 25a and the pin 38a, and the first rotational movement supporting points 27e1 and 27e2 placed on the 0 degree side of the leading ring 27 becomes apart from the 0 degree side bottom surface portion 22c of the lower drum 22.

Therefore, though the 0 degree side bottom surface portion 27c of the leading ring 27 is rotationally moved by the track inclination correcting angle θ1 in the lower direction (or the counterclockwise direction) with respect to the lower drum 22 around the second rotational movement supporting points 27f1 and 27f2 positioned on the 180 degree side leading ring 27 while resisting the spring power of the compression spring 39a (FIG. 17), because the 0 degree side bottom surface portion 27c of the leading ring 27 is rotationally moved in the clockwise direction with respect to the drum base 28, a track correction is performed. In this track correction, the inclination angle of the drum axis 24 is successively changed according to the traveling speed of the magnetic tape MT with respect to the imaginary central axis of the leading ring 27 in the FF and FB reproducing mode operations to make a recorded track formed on the magnetic tape MT agree with a scanning locus of each of the magnetic heads 23a and 23b.

And, the leading correction is performed by the lead inclination correcting angle θ2 obtained by subtracting the track inclination correcting angle θ1 caused by the screw 25a screwed into the leading ring 27 from the whole drum inclination correcting angle θ caused by the screw 24a screwed into the drum base 28, and the inclination of the leading ring 27 is corrected along the lead inclination angle correcting characteristic (FIG. 20) according to the tape traveling speed.

Because the magnetic tape MT is pulled in a direction of the rotation of the drum structure DS caused by the track correction, the reference edge Te of the magnetic tape MT intends to be apart from the lead 27a on the inlet side of the magnetic tape MT, and the reference edge Te of the magnetic tape MT intends to be pushed to the lead 27a on the outlet side of the magnetic tape MT. Therefore, in the leading correction in the FF reproducing mode operation, the leading ring 27 is rotationally moved to make the lead 27a match with the reference edge Te of the magnetic tape MT. In this case, a relative angle between the lead 27a adjusted for a fast feeding tape traveling speed in the FF reproduction and a scanning locus of each of the magnetic heads 23a and 23b is maintained.

Therefore, even though the reference edge Te of the magnetic tape MT is induced by the track correction to be apart from the lead 27a, because the leading correction is performed, the reference edge Te of the magnetic tape MT is stably lead by the lead 27a over the entire binding range of the magnetic tape MT bound to the drum structure DS. Accordingly, when the magnetic tape MT is traveled at a prescribed fast feeding tape speed, a scanning locus of each of the magnetic heads 23a and 23b agrees with a track pattern recorded on the magnetic tape MT, and a reproduced signal indicating an envelope set to a superior condition can be obtained.

Next, as shown in FIG. 21C, in cases where the recording or reproducing operation is performed for the magnetic tape MT traveled at a fast back-feeding speed differing from the standard speed in a minus direction (for example, in cases where the normal reproducing mode is changed to the FB reproducing mode), the motor 42 (FIG. 19) is operated to push out the screws 24b and 25b placed on the 180 degree side in the upper direction according to the fast back-feeding speed. In this case, the screws 24a and 25a placed on the 0 degree side are pushed out in a relief direction apart from the lower drum 22. That is, when the screw 24b screwed into the drum base 28 is pushed out in the upper direction, the location pin 37b (FIG. 16) fixedly attached to the 180 degree side bottom surface portion 22c of the lower drum 22 is pushed up by a top of the screw 24b. Therefore, the 0 degree side bottom surface portion 22c of the lower drum 22 is touched to the first rotational movement supporting points 28e1 and 28e2 placed on the 0 degree side of the drum base 28, and the second rotational movement supporting points 28f1 and 28f2 placed on the 180 degree side of the drum base 28 become apart from the 180 degree side bottom surface portion 22c of the lower drum 22. As a result, the leading ring 27 and the upper and lower drums 21 and 22 supported by the drum axis 24 are rotationally moved in the counterclockwise direction around the first rotational movement supporting points 28e1 and 28e2 while resisting the spring power of the compression springs 81a and 81b (FIGS. 16 and 18).

Therefore, the leading ring 27 and the upper and lower drums 21 and 22 supported by the drum axis 24 are rotationally moved in the whole drum correction along the whole drum inclination angle correcting characteristic (FIG. 20).

Also, because the screw 25b screwed into the leading ring 27 on the 180 degree side is pushed out while pushing out the screw 24b, when a top of the screw 25b is touched to the pin 38b (FIG. 17) fixedly attached to the 180 degree side bottom surface portion 22c of the lower drum 22, the 0 degree side bottom surface portion 22c of the lower drum 22 is touched to the first rotational movement supporting points 27e1 and 27e2 placed on the 0 degree side of the leading ring 27 by a reaction force generated by the contact of the screw 25b and the pin 38b, and the second rotational movement supporting points 27f1 and 27f2 placed on the 180 degree side of the leading ring 27 becomes apart from the 180 degree side bottom surface portion 22c of the lower drum 22.

Therefore, though the 180 degree side bottom surface portion 27c of the leading ring 27 is rotationally moved in the lower direction (or the clockwise direction) with respect to the lower drum 22 around the first rotational movement supporting points 27e1 and 27e2 positioned on the 0 degree side leading ring 27 while resisting the spring power of the compression spring 39b (FIG. 17), because the 180 degree side bottom surface portion 27c of the leading ring 27 is rotationally moved in the counterclockwise direction with respect to the drum base 28, a track correction is performed, the leading correction obtained by subtracting the track correction caused by the screw 25b screwed into the leading ring 27 from the whole drum correction caused by the screw 24b screwed into the drum base 28 is performed, and the inclination of the leading ring 27 is corrected along the lead inclination angle correcting characteristic (FIG. 20) for the FB reproducing mode operation.

Because the magnetic tape MT is pulled in a direction of the rotation of the drum structure DS caused by the track correction, the reference edge Te of the magnetic tape MT intends to be apart from the lead 27a on the inlet side of the magnetic tape MT, and the reference edge Te of the magnetic tape MT intends to be pushed to the lead 27a on the outlet side of the magnetic tape MT. Therefore, in the leading correction in the FB reproducing mode operation, the leading ring 27 is rotationally moved to make the lead 27a match with the reference edge Te of the magnetic tape MT.

Therefore, even though the reference edge Te of the magnetic tape MT is induced by the track correction to be apart from the lead 27a, because the leading correction is performed, the reference edge Te of the magnetic tape MT is stably lead by the lead 27a over the entire binding range of the magnetic tape MT bound to the drum structure DS. Accordingly, when the magnetic tape MT is traveled at a prescribed fast back-feeding tape speed, a scanning locus of each of the magnetic heads 23a and 23b agrees with a track pattern recorded on the magnetic tape MT, and a reproduced signal indicating an envelope set to a superior condition can be obtained.

Figure 22:
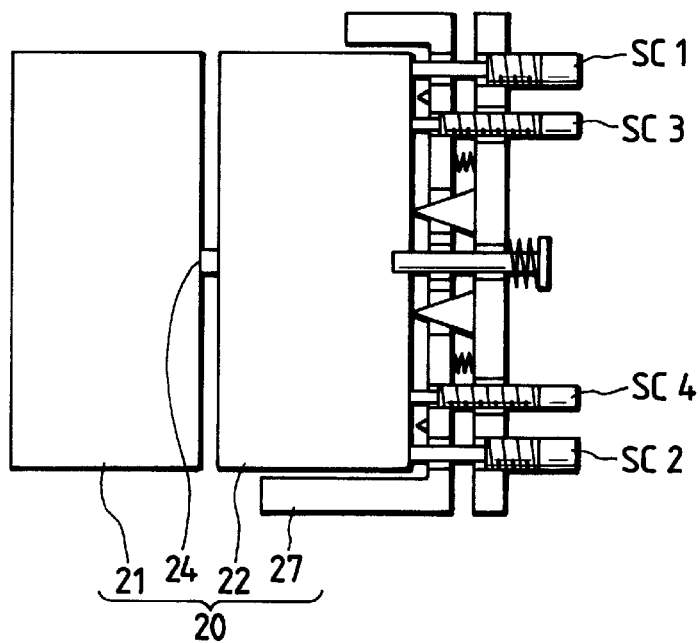
FIG. 22 is a side view of the rotational drum and a plurality of correction adjusting screws.
Figure 23:
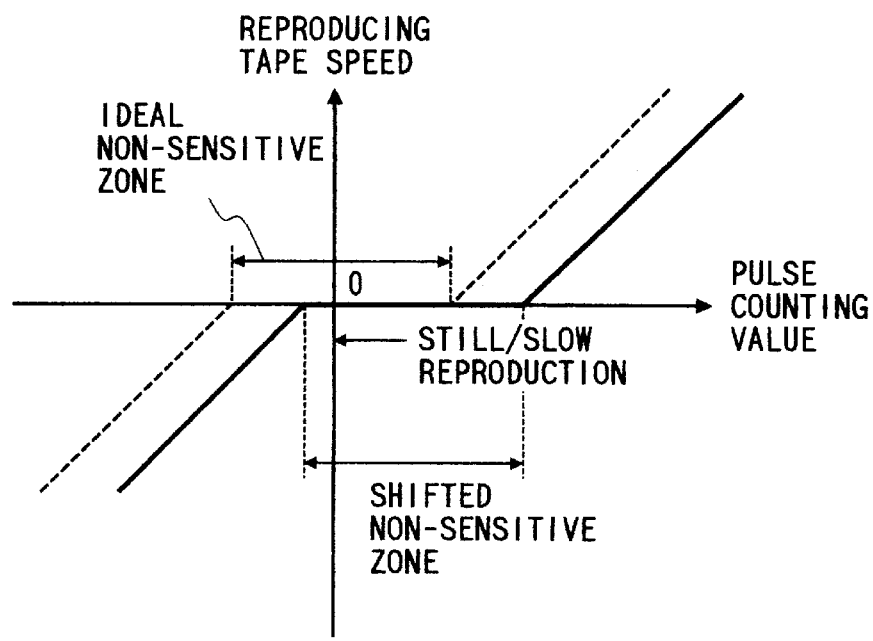
FIG. 23 shows the relationship between a reproducing tape speed and a pulse counting value on condition that a non-sensitive zone is shifted from a real non-sensitive zone.

As shown in FIG. 22, the inclination angle of the rotational drum 20 composed of the leading ring 27 and the upper and lower drums 21 and 22 can be adjusted in advance to a target angle by using a pair of whole drum correction adjusting screws SC1 and SC2 and a pair of track correction adjusting screws SC3 and SC4. However, as shown in FIG. 23, in cases where a width of the non-sensitive zone is shifted from an ideal width because of non-uniformity of constructional parts, a phase difference between the photo-electro sensor 52 and the series of gears and friction and abrasion of the adjusting screws SC1 to SC4, even though the inclination of the rotational drum 20 is adjusted according to the number of pulses (or the current pulse counting value) corresponding to the target angle, the inclination of the rotational drum 20 cannot be adjusted to the target angle, and the magnetic heads 23a and 23b cannot accurately trace a track pattern.

Next, an adjusting method for adjusting the non-sensitive zone (FIG. 20) of the rotational drum 20 is described with reference to FIGS. 24 and 25. In this case, as shown in FIG. 23, regardless of the width of the non-sensitive zone, the inclination angle of the rotational drum 20 corresponding to a reproducing tape speed changes in proportion to the pulse counting value, indicating the number of rotations of a rotor of the motor 42, counted by the pulse counter through the photo-electro sensor 51. This proportional relationship is obtained for the forward tape traveling direction and the reverse tape traveling direction. The tape traveling directions for a slow reproduction and a still reproduction are classified into the reverse tape traveling direction. Therefore, even though the width of the non-sensitive zone changes, the difference in the pulse counting value between a first tape traveling speed and a second tape traveling speed is constant.

Figure 24:
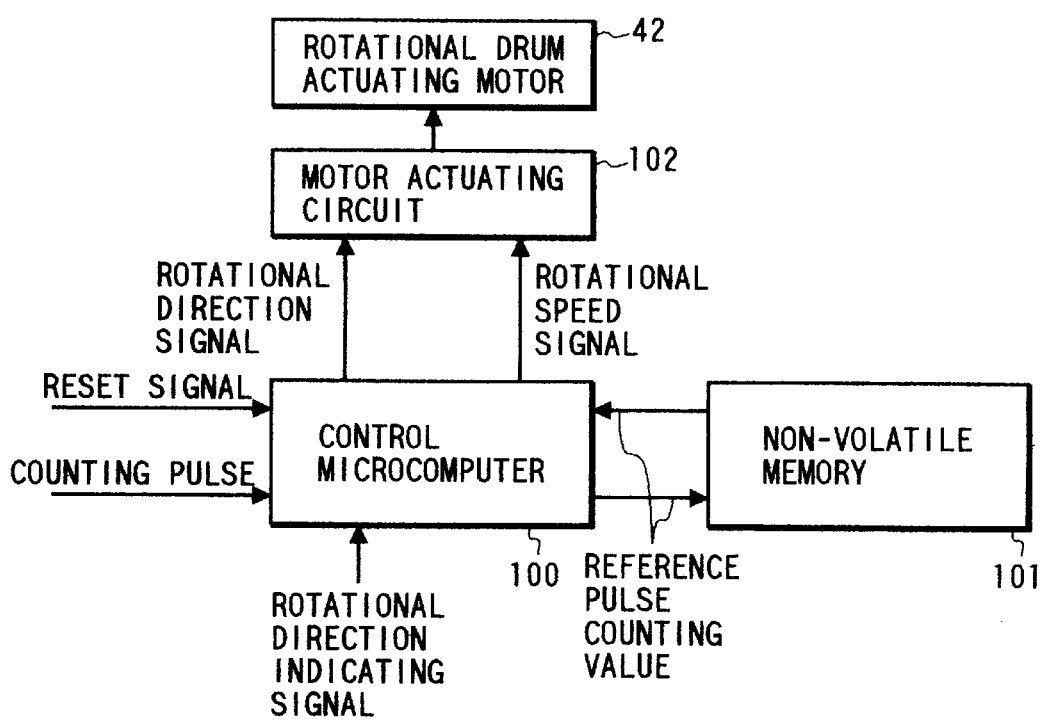
FIG. 24 is a block diagram of a rotational drum actuating system of a magnetic recording and reproducing apparatus corresponding to the third embodiment of the present invention.

FIG. 24 is a block diagram of a rotational drum actuating system of a magnetic recording and reproducing apparatus corresponding to the third embodiment of the present invention.

As shown in FIG. 24, in this adjusting method, a reference pulse counting value corresponding to a referential reproducing tape speed directed in the forward or reverse direction is stored in a non-volatile memory 101 in advance, and a target counting value corresponding to a target reproducing tape speed is obtained as a sum of the reference pulse counting value and a differential counting value between the referential reproducing tape speed and the target reproducing tape speed. In this case, the referential reproducing tape speed is an arbitrary speed except for a normal reproducing tape speed and a recording tape speed. Therefore, in cases where a width of the non-sensitive zone for a particular magnetic recording and reproducing apparatus differs from that for another apparatus or the width of the non-sensitive zone changes, the reference pulse counting value stored in the non-volatile memory 101 is only adjusted.

An 8-bit rotational speed signal indicating a rotational speed of a rotor of the rotational drum actuating motor 42 and a rotational direction signal indicating a rotational direction of the rotor of the motor 42 are transmitted from a control microcomputer 100 to a motor actuating circuit 102 having a D/A converter, and the rotational drum actuating motor 42 is actuated by the motor actuating circuit 102 according to the 8-bit rotational speed signal and the rotational direction signal. Also, a counting pulse obtained from the motor 42 for each rotation of a rotor of the motor 42 and a reset signal are fetched into the control microcomputer 100. Each of the counting pulses fetched is added to a pulse counting value in cases where the rotor of the motor 42 is rotated in a plus direction, and each of the counting pulses fetched is subtracted from a pulse counting value in cases where the rotor of the motor 42 is rotated in a plus direction. Pulse counting values corresponding to the normal reproducing tape speed and the recording tape speed are reset to zero by the reset signal. Also, a differential counting value between the referential reproducing tape speed and the target reproducing tape speed is stored in a ROM of the control microcomputer 100. Because the differential counting value is constant, it is not required to change the differential counting value. Therefore, a current inclination angle of the rotational drum 20 is detected.

Figure 25:
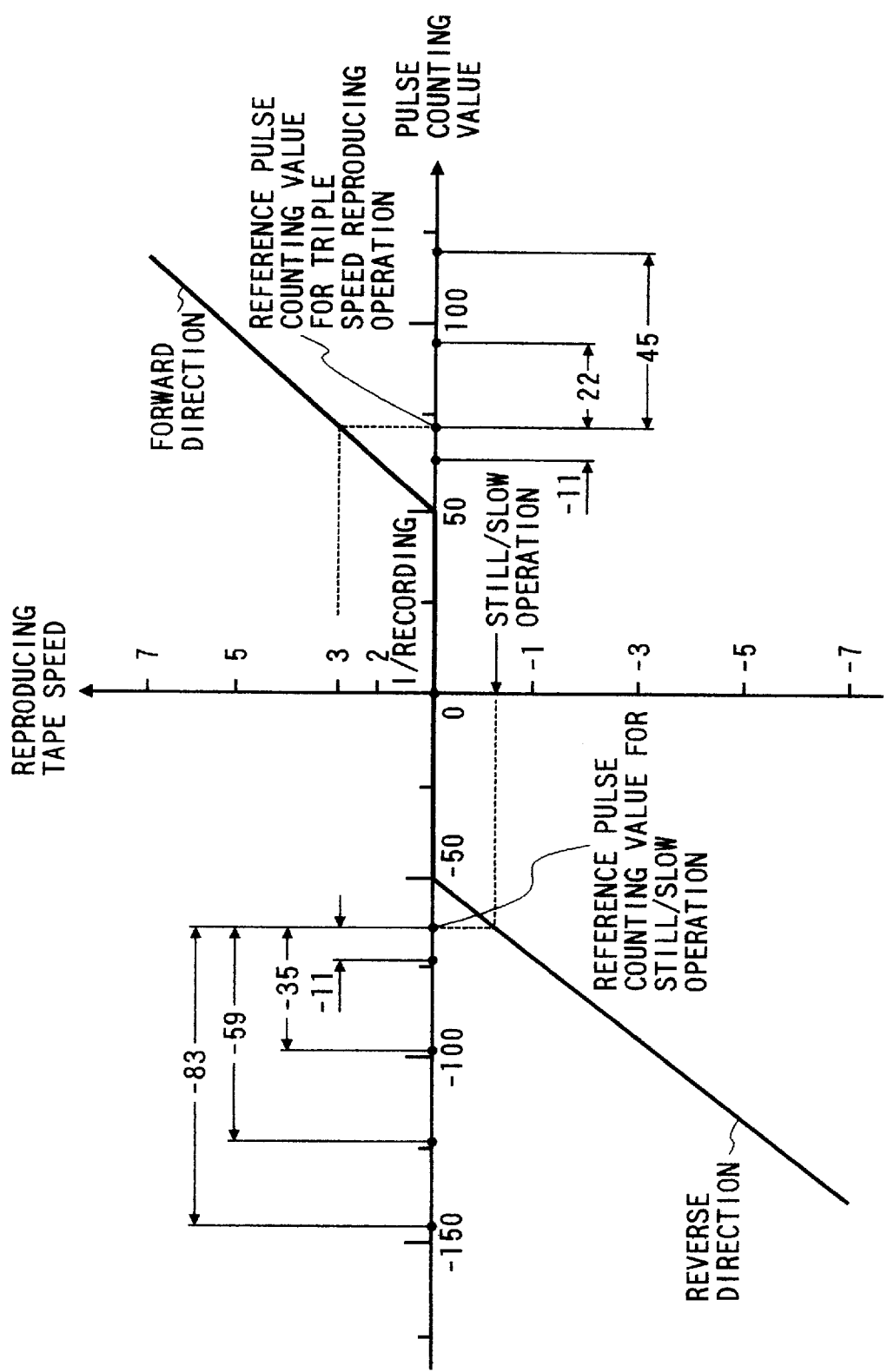
FIG. 25 shows the relationship between a reproducing tape speed and a pulse counting value in the magnetic recording and reproducing apparatus.

FIG. 25 shows the relationship between a reproducing tape speed and a pulse counting value in the magnetic recording and reproducing apparatus.

As shown in FIG. 25, a first case that a triple reproducing tape speed three times as high as the normal reproducing tape speed is set as the referential reproducing tape speed directed in the forward direction and a second case that a still/slow reproducing tape speed is set as the referential reproducing tape speed directed in the reverse direction are selected, and a first reference pulse counting value corresponding to the triple reproducing tape speed and a second reference pulse counting value corresponding to the still/slow reproducing tape speed are set. Also, four target reproducing tape speeds for the first reference pulse counting value and three target reproducing tape speeds for the second reference pulse counting value are shown.

The adjustment of the first (or second) reference pulse counting value is as follows. After the rotational drum 20 is attached to the magnetic recording and reproducing apparatus, a reproduced video FM signal is reproduced from a magnetic tape MT on which the straightness of a recording track pattern is guaranteed at the referential reproducing tape speed, a rotor of the motor 42 is rotated while observing the reproduced video FM signal, the inclination angle of the rotational drum 20 is adjusted to flatten an envelope of the reproduced video FM signal, a reference pulse counting value corresponding to the adjusted inclination angle is stored in the non-volatile memory 101 as a renewed reference pulse counting value.

Accordingly, in cases where a width of the non-sensitive zone for a particular magnetic recording and reproducing apparatus differs from that for another apparatus or the width of the non-sensitive zone changes, an appropriate reference pulse counting value is stored in the non-volatile memory 101 of each apparatus, even though the magnetic tape MT is traveled at a target reproducing tape speed representing a fast feeding or back-feeding speed, a target pulse counting value corresponding to the target reproducing tape speed can be obtained as a sum of the reference pulse counting value stored in the non-volatile memory 101 and a differential counting value between the referential reproducing tape speed and the target reproducing tape speed stored in the ROM of the control microcomputer 100. Therefore, the inclination angle of the rotational drum 20 can be set to a target angle corresponding to the target pulse counting value.

As a result, a plurality of effects can be obtained as follows.

First, because the reference pulse counting value can be easily and accurately adjusted and stored in the non-volatile memory 101, even though a large number of apparatuses are manufactured, the inclination angle of the rotational drum 20 in each of the apparatuses can be easily and accurately set.

Secondly, even though a width of the non-sensitive zone for a particular magnetic recording and reproducing apparatus differs from that for another apparatus or the width of the non-sensitive zone changes, because the inclination angle of the rotational drum 20 appropriate for each of target reproducing tape speeds can be obtained by adjusting the reference pulse counting value, the adjustment of the target reproducing tape speed can be easily performed, and the reproductivity of the apparatus can be heightened.

Thirdly, because the reference pulse counting value is stored in the non-volatile memory 101 in which data are writable and readable, the inclination angle of the rotational drum 20 shifted from a target angle because of the friction and abrasion of constitutional parts can be easily corrected.

In the third embodiment, one reference pulse counting value is determined for the reproducing tape speed directed in the forward direction, and another reference pulse counting value is determined for the reproducing tape speed directed in the reverse direction. However, because the magnetic tape MT is traveled at one of N-times reproducing tape speeds which respectively is N times as high as the normal reproducing tape speed, it is applicable that one reference pulse counting value be determined for each of the N-times reproducing tape speeds and a plurality of reference pulse counting values corresponding to the N-times reproducing tape speeds be stored in the non-volatile memory 101. In this case, any differential counting value between one referential reproducing tape speed and one target reproducing tape speed is not required. Therefore, the inclination angle of the rotational drum 20 can be accurately set according to one of the reference pulse counting values stored in the non-volatile memory 101.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A magnetic recording and reproducing apparatus, comprising:

a rotational head for helically scanning a magnetic tape and reading out a reproduced signal from the magnetic tape;

a rotational drum on which the rotational head is mounted;

inclination angle changing means for changing an inclination angle of the rotational drum with respect to the magnetic tape to change a scanning direction of the rotational head with respect to the magnetic tape;

envelope detecting means for detecting an envelope of the reproduced signal, in a predetermined period, read by the rotational head of which the scanning direction is changed by the inclination angle changing means;

period dividing means for dividing the predetermined period into a plurality of shortened periods;

integrating means for integrating the envelope detected by the envelope detecting means over each of the shortened periods obtained by the period dividing means to obtain a plurality of integrated values;

envelope shape change detecting means for detecting a changing degree of a shape of the envelope detected by the envelope detecting means according to the integrated values obtained by the integrating means;

envelope shape change judging means for judging whether the changing degree detected by the envelope shape change detecting means is high or low;

control signal generating means for generating a macro-search signal in cases where it is judged by the envelope shape change judging means that the changing degree detected by the envelope shape change detecting means is high and generating a micro-search signal in cases where it is judged by the envelope shape change judging means that the changing degree is low;

inclination angle control means for controlling the inclination angle changing means to make the changing degree detected by the envelope shape change detecting means low by largely changing the inclination angle of the rotational drum according to the macro-search signal generated by the control signal generating means or to minimize the changing degree by slightly changing the inclination angle of the rotational drum according to the micro-search signal generated by the control signal generating means; and signal processing means for processing the reproduced signal in which the changing degree of the shape of the envelope is minimized by the inclination angle changing means under control of the inclination angle control means.

2. A magnetic recording and reproducing apparatus according to claim 1, in which the envelope shape change judging means comprises:

low changing degree judging means for judging that the changing degree is low in cases where a level of the envelope indicates no change, a monotone increase, a monotone decrease, or a decrease after an increase; and high changing degree judging means for judging that the changing degree is high in cases where a level of the envelope repeats an increase and decrease.

3. A method for controlling an inclination angle of a rotational drum on which a rotational head helically scanning a magnetic tape is mounted, comprising the steps of:

producing an envelope in a predetermined period from a reproduced signal read from the magnetic tape by the rotational head;

dividing the predetermined period into a plurality of shortened periods;

integrating the envelope over each of the shortened periods to obtain a plurality of integrated values;

detecting a changing degree of a shape of the envelope according to the integrated values;

judging whether the changing degree is high or low;

largely changing the inclination angle of the rotational drum until the changing degree of the shape of the envelope becomes low in cases where it is judged that the changing degree is high;

slightly changing the inclination angle of the rotational drum until the changing degree of the shape of the envelope is minimized in cases where it is judged that the changing degree is low; and processing the reproduced signal from which the envelope of which the shape changing degree is minimized is produced.

4. A method according to claim 3, in which the step of judging whether the changing degree is high or low comprises the steps of:

judging that the changing degree is low in cases where a level of the envelope indicates no change, a monotone increase, a monotone decreases or a decrease after an increase; and judging that the changing degree is high in cases where a level of the envelope repeats an increase and decrease.

5. A method according to claim 3, further comprising the steps of:

detecting a level of the reproduced signal from which the envelope of which the shape changing degree is minimized is produced; and controlling a magnetic tape traveling speed to maximize the level of the reproduced signal to process the reproduced signal, of which the level is maximized, in the step of processing the reproduced signal.

6. A method for controlling an inclination angle of a rotational drum on which a rotational head helically scanning a magnetic tape is mounted, comprising the steps of:

judging whether or not a magnetic tape traveling speed is changed to a particular magnetic tape traveling speed;

judging whether or not a particular inclination angle of the rotational drum appropriate to the particular magnetic tape traveling speed is known in cases where the magnetic tape traveling speed is changed to the particular magnetic tape traveling speed;

changing the inclination angle of the rotational drum to the particular inclination angle in cases where the particular magnetic tape traveling speed is known;

processing a plurality of reproduced signals read from the magnetic tape one after another by the rotational head mounted on the rotational drum of which the inclination angle is changed to the particular inclination angle;

producing an envelope in a predetermined period from each of a plurality of reproduced signals read from the magnetic tape one after another by the rotational head in cases where the particular magnetic tape traveling speed is not known;

dividing the predetermined period into a plurality of shortened periods;

integrating the envelope over each of the shortened periods to obtain a plurality of integrated values;

detecting a changing degree of a shape of the envelope according to the integrated values;

judging whether the changing degree is high or low;

largely changing the inclination angle of the rotational drum until the changing degree of the shape of the envelope becomes low in cases where it is judged that the changing degree is high;

slightly changing the inclination angle of the rotational drum until the changing degree of the shape of the envelope is minimized in cases where it is judged that the changing degree is low; and processing the reproduced signal from which the envelope of which the shape changing degree is minimized is produced.

* * * * *